US012683932B2

(12) United States Patent
Andrews et al.

(10) Patent No.: US 12,683,932 B2

(45) Date of Patent: Jul. 14, 2026

(54) DYNAMIC ROUTING OF APPLICATION TRAFFIC TO ZTNA CONNECTORS

(71) Applicant: Sophos Limited, Abingdon (GB)

(72) Inventors: Robert Paul Andrews, Pflugerville, TX (US); Venkata Suresh Reddy Obulareddy, Bangalore (IN); Amit Katyal, Bangalore (IN); Thiyagu Rajendran, Bangalore (IN)

(73) Assignee: Sophos Limited, Abingdon (GB)

( * ) Notice: Subject to any disclaimer, the term of this patent is extended or adjusted under 35 U.S.C. 154(b) by 124 days.

(21) Appl. No.: 18/090,025

(22) Filed: Dec. 28, 2022

(65) Prior Publication Data

US 2024/0129278 A1 Apr. 18, 2024

Related U.S. Application Data

(63) Continuation of application No. PCT/US2022/054075, filed on Dec. 27, 2022.

(30) Foreign Application Priority Data

Oct. 15, 2022 (IN) .............................. 202211058975

(51) Int. Cl.
*H04L 9/40* (2022.01)
*G06F 21/53* (2013.01)
(Continued)

(52) U.S. Cl.
CPC .......... *H04L 63/0281* (2013.01); *G06F 21/53* (2013.01); *G06F 21/64* (2013.01);
(Continued)

(58) Field of Classification Search
CPC ... H04L 63/0281; H04L 41/12; H04L 61/302; H04L 63/0236; H04L 63/029;
(Continued)

(56) References Cited

U.S. PATENT DOCUMENTS 8,396,969 B1 3/2013 Schwartz et al.
11,036,885 B1 6/2021 Abdelkader et al.
(Continued)

FOREIGN PATENT DOCUMENTS

WO WO-2020180776 9/2020
WO WO-2024081014 4/2024

OTHER PUBLICATIONS

Dasher et al. "Architectures for Protecting Cloud Data Plane" Jan. 31, 2022 (Year: 2022).*
(Continued)

*Primary Examiner* — Farid Homayounmehr
*Assistant Examiner* — Mudasiru K Olaegbe
(74) *Attorney, Agent, or Firm* — Strategic Patents, P.C.

(57) ABSTRACT

A cloud computing platform provides zero trust network access as a service to customers that maintain applications on-premises, and a zero trust network access appliance at the customer premises that couples the on-premises applications to the cloud computing platform. A customer may host multiple instances of the appliance in order to support scalable access, where each instance creates a separate secure tunnel to the cloud computing platform. In this context, when a new appliance authenticates a new secure tunnel, information such as a connector name, customer, and port for the tunnel may be shared on a control plane for the computing platform to facilitate programmatic load balancing within the cloud computing platform.

20 Claims, 12 Drawing Sheets

(51) Int. Cl.

| | |
|---|---|
| *G06F 21/64* | (2013.01) |
| *H04L 61/3015* | (2022.01) |
| *H04L 67/1008* | (2022.01) |
| *H04L 67/1036* | (2022.01) |
| *H04L 41/12* | (2022.01) |

(52) U.S. Cl.
CPC ........ *H04L 61/302* (2013.01); *H04L 63/0236* (2013.01); *H04L 63/029* (2013.01); *H04L 63/0823* (2013.01); *H04L 63/083* (2013.01); *H04L 63/0884* (2013.01); *H04L 63/1425* (2013.01); *H04L 63/20* (2013.01); *H04L 67/1008* (2013.01); *H04L 67/1036* (2013.01); *G06F 2221/033* (2013.01); *H04L 41/12* (2013.01); *H04L 63/0272* (2013.01)

(58) Field of Classification Search
CPC ............... H04L 63/0823; H04L 63/083; H04L 63/0884; H04L 63/1425; H04L 63/20; H04L 67/1008; H04L 67/1036; H04L 41/0894; H04L 43/50; H04L 63/08; H04L 63/0807; H04L 63/1441; G06F 21/53; G06F 21/64; G06F 2221/033
See application file for complete search history.

(56) References Cited

U.S. PATENT DOCUMENTS

| | | | |
|---|---|---|---|
| 11,240,242 | B1 | 2/2022 | Celik |
| 11,689,522 | B2 | 6/2023 | Kulkarni et al. |
| 11,783,925 | B2 | 10/2023 | Ansari et al. |
| 11,811,734 | B2 | 11/2023 | Chen et al. |
| 11,895,092 | B2 | 2/2024 | Glazemakers et al. |
| 11,949,661 | B2 | 4/2024 | Shah et al. |
| 12,010,141 | B1 | 6/2024 | Mogra et al. |
| 12,095,794 | B1 | 9/2024 | Karaje et al. |
| 12,101,247 | B2 | 9/2024 | Vysotsky et al. |
| 2012/0017259 | A1 | 1/2012 | Maccarthaigh |
| 2012/0331528 | A1* | 12/2012 | Fu ........................... H04L 67/10 |
| | | | 726/4 |
| 2017/0310693 | A1 | 10/2017 | Howard et al. |
| 2018/0103009 | A1* | 4/2018 | Eberlein ............... H04L 63/029 |
| 2019/0158423 | A1 | 5/2019 | Li et al. |
| 2019/0297079 | A1 | 9/2019 | Delcourt et al. |
| 2020/0073717 | A1 | 3/2020 | Hari |
| 2020/0177544 | A1 | 6/2020 | Mccarty et al. |
| 2020/0236112 | A1 | 7/2020 | Pularikkal et al. |
| 2020/0287869 | A1 | 9/2020 | Glazemakers et al. |
| 2021/0029201 | A1 | 1/2021 | Masurekar et al. |
| 2021/0075790 | A1 | 3/2021 | Hebert et al. |
| 2021/0160237 | A1 | 5/2021 | Rozner et al. |
| 2021/0250333 | A1 | 8/2021 | Negrea et al. |
| 2021/0336788 | A1 | 10/2021 | Ziegler et al. |
| 2021/0385221 | A1* | 12/2021 | Nieman .............. H04L 41/0803 |
| 2021/0392111 | A1 | 12/2021 | Sole et al. |
| 2022/0006805 | A1 | 1/2022 | Kulkarni et al. |
| 2022/0046059 | A1 | 2/2022 | Pandurangi et al. |
| 2022/0103527 | A1* | 3/2022 | Niemi ................. H04L 63/0281 |
| 2022/0141184 | A1 | 5/2022 | Oswal et al. |
| 2022/0141254 | A1 | 5/2022 | Oswal et al. |
| 2022/0210173 | A1 | 6/2022 | Katmor et al. |
| 2022/0224621 | A1 | 7/2022 | Devarajan et al. |
| 2022/0224622 | A1 | 7/2022 | Kamath et al. |
| 2022/0224623 | A1 | 7/2022 | Kamath et al. |
| 2022/0224703 | A1 | 7/2022 | Devarajan |
| 2022/0272082 | A1 | 8/2022 | Gupta et al. |
| 2022/0278917 | A1 | 9/2022 | Voderbet et al. |
| 2022/0311822 | A1 | 9/2022 | Nord et al. |
| 2022/0345463 | A1 | 10/2022 | Wu et al. |
| 2022/0393943 | A1* | 12/2022 | Pangeni .............. H04L 41/0894 |
| 2022/0394083 | A1* | 12/2022 | Pangeni .............. H04L 67/1001 |
| 2022/0400114 | A1 | 12/2022 | Sreedhar et al. |
| 2022/0400116 | A1 | 12/2022 | Sreedhar et al. |
| 2022/0407840 | A1 | 12/2022 | Chen et al. |
| 2023/0049547 | A1 | 2/2023 | Glazemakers et al. |
| 2023/0069738 | A1 | 3/2023 | Sreedhar et al. |
| 2023/0115982 | A1 | 4/2023 | Lin et al. |
| 2023/0122630 | A1* | 4/2023 | Balaiah ............... H04L 12/4641 |
| | | | 709/224 |
| 2023/0139695 | A1 | 5/2023 | Xu et al. |
| 2023/0188505 | A1 | 6/2023 | Jensen |
| 2023/0198764 | A1 | 6/2023 | Panicker et al. |
| 2023/0229787 | A1 | 7/2023 | Mahdavipour et al. |
| 2023/0239297 | A1 | 7/2023 | McElhoe et al. |
| 2023/0247003 | A1 | 8/2023 | Chanak et al. |
| 2023/0254318 | A1 | 8/2023 | Hu et al. |
| 2023/0269252 | A1 | 8/2023 | Bakke |
| 2023/0328063 | A1 | 10/2023 | Li et al. |
| 2023/0353543 | A1 | 11/2023 | Solanki et al. |
| 2023/0362202 | A1 | 11/2023 | Li et al. |
| 2023/0367605 | A1* | 11/2023 | Bedi ................... G06F 9/44505 |
| 2023/0379405 | A1* | 11/2023 | Chhabra ............. H04L 61/2528 |
| 2023/0403282 | A1 | 12/2023 | Smith et al. |
| 2023/0403304 | A1 | 12/2023 | Balmakhtar et al. |
| 2024/0031337 | A1 | 1/2024 | Sharma et al. |
| 2024/0031413 | A1 | 1/2024 | Oswal et al. |
| 2024/0048564 | A1 | 2/2024 | Sreedhar et al. |
| 2024/0064138 | A1 | 2/2024 | Jain et al. |
| 2024/0073236 | A1* | 2/2024 | Schumacher ......... H04L 63/083 |
| 2024/0073694 | A1 | 2/2024 | Srinivas et al. |
| 2024/0080744 | A1 | 3/2024 | Hotchkiss et al. |
| 2024/0103932 | A1* | 3/2024 | Hebbar ................. G06F 9/4416 |
| 2024/0126868 | A1 | 4/2024 | Andrews et al. |
| 2024/0129277 | A1 | 4/2024 | Andrews et al. |
| 2024/0129296 | A1 | 4/2024 | Andrews et al. |
| 2024/0129297 | A1 | 4/2024 | Obulareddy et al. |
| 2024/0129298 | A1 | 4/2024 | Obulareddy et al. |
| 2024/0129310 | A1 | 4/2024 | Andrews et al. |
| 2024/0171555 | A1* | 5/2024 | Chen ...................... H04L 69/22 |
| 2024/0205231 | A1 | 6/2024 | Bardhan et al. |
| 2024/0214350 | A1 | 6/2024 | Sole et al. |
| 2024/0289264 | A1 | 8/2024 | Desai |
| 2024/0414160 | A1 | 12/2024 | Bakke |
| 2025/0260671 | A1 | 8/2025 | Andrews et al. |
| 2025/0260672 | A1 | 8/2025 | Andrews et al. |
| 2026/0019406 | A1 | 1/2026 | Obulareddy et al. |

OTHER PUBLICATIONS

Dasher et al. "Architectures for Protecting Cloud Data Planes" (Year: 2022).*
EPO Searching Authority, "PCT Application No. PCT/US22/054075 International Search Report and Written Opinion mailed Jul. 3, 2023", 15 pages.
USPTO, , "U.S. Appl. No. 18/089,930 Non-Final Office Action mailed Oct. 24, 2024", 19 pages.
USPTO, , "U.S. Appl. No. 18/089,946 Non-Final Office Action mailed Sep. 23, 2024", 10 pages.
USPTO, , "U.S. Appl. No. 18/089,967 Non-Final Office Action mailed Dec. 23, 2024", 24 pages.
USPTO, , "U.S. Appl. No. 18/089,997 Non-Final Office Action mailed Nov. 6, 2024", 11 pages.
USPTO, , "U.S. Appl. No. 18/089,930 Notice of Allowance mailed Feb. 26, 2025", 8 pages.
USPTO, , "U.S. Appl. No. 18/089,946 Notice of Allowance mailed Jan. 21, 2025", 8 pages.
USPTO, , "U.S. Appl. No. 18/089,967 Notice of Allowance mailed Apr. 28, 2025", 15 pages.
USPTO, , "U.S. Appl. No. 18/089,997 Notice of Allowance mailed May 7, 2025", 5 pages.
USPTO, , "U.S. Appl. No. 18/090,009 Non-Final Office Action mailed Mar. 27, 2025", 15 pages.
USPTO, , "U.S. Appl. No. 18/090,009 Notice of Allowance mailed Oct. 7, 2025", , 5 pages.
USPTO, , "U.S. Appl. No. 18/090,041 Notice of Allowance mailed Jul. 1, 2025", 11 pages.
EPO, , "EP Application No. 25176890.9 Extended Search Report mailed Jun. 13, 2025", 11 pages.
WIPO, , "PCT Application No. PCT/US22/54075 International Preliminary Report on Patentability mailed Apr. 24, 2025", 10 pages.

(56)     References Cited

OTHER PUBLICATIONS

EPO, , "EP Application No. 25176890.9 Communication Pursuant to Article 94(3) mailed Jan. 30, 2026", , 7 pages.
Scott, Rose et al., "Zero trust architecture", National Institute of Standards and Technology, XP093129063, DOI: 10.6028/NIST.SP. 800-207. Retrieved from the Internet: URL:https://nvlpubs.nist.gov/nistpubs/SpecialPublications/NIST.SP. 800-207.pdf NPL-1264 Feb. 1, 2020 , 59 pages.
EPO, , "EP Application No. 22854614.9 Communication Pursuant to Article 94(3) mailed May 4, 2026", NPL-1265, 12 pages.

* cited by examiner

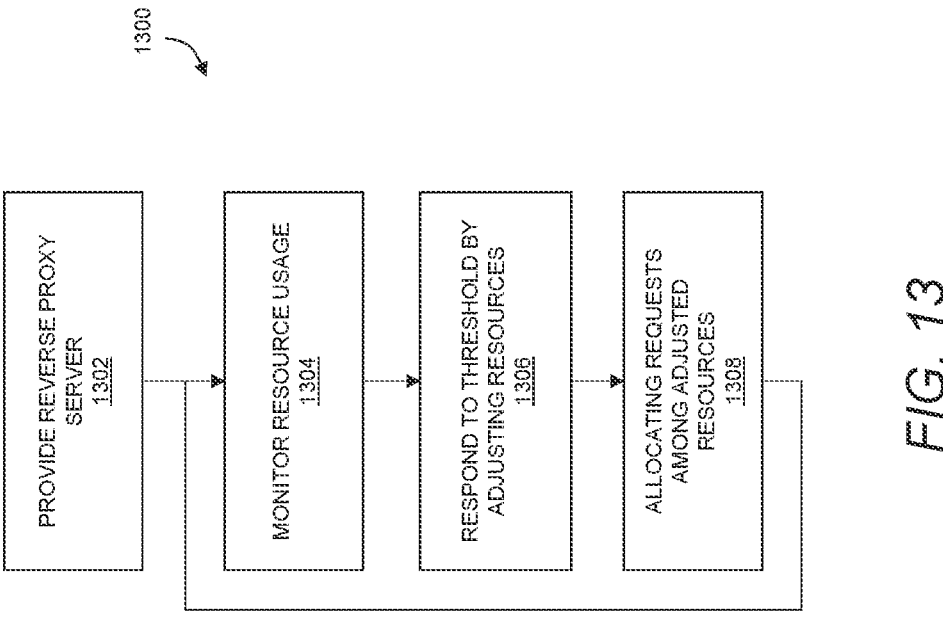

1300

PROVIDE REVERSE PROXY SERVER
1302

MONITOR RESOURCE USAGE
1304

RESPOND TO THRESHOLD BY ADJUSTING RESOURCES
1306

ALLOCATING REQUESTS AMONG ADJUSTED RESOURCES
1308

*FIG. 13*

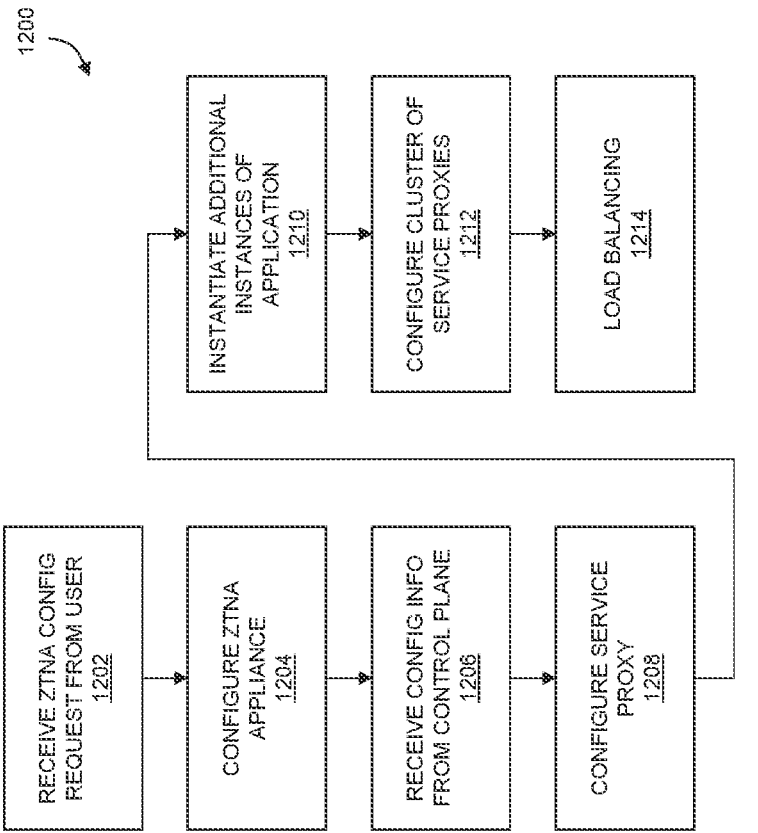

1200

RECEIVE ZTNA CONFIG REQUEST FROM USER
1202

CONFIGURE ZTNA APPLIANCE
1204

RECEIVE CONFIG INFO FROM CONTROL PLANE
1206

CONFIGURE SERVICE PROXY
1208

INSTANTIATE ADDITIONAL INSTANCES OF APPLICATION
1210

CONFIGURE CLUSTER OF SERVICE PROXIES
1212

LOAD BALANCING
1214

*FIG. 12*

DYNAMIC ROUTING OF APPLICATION TRAFFIC TO ZTNA CONNECTORS

CROSS-REFERENCE TO RELATED APPLICATIONS

This application is a bypass continuation that claims priority to International Patent Application No. PCT/US22/54075 filed on Dec. 27, 2022, which claims priority to Indian Patent Application No. 202211058975 filed on Oct. 15, 2022, where the entire content of each of the foregoing is hereby incorporated by reference.

BACKGROUND

There remains a need for improved techniques for deploying and managing zero trust network access applications with a cloud-based security infrastructure.

SUMMARY

A zero trust network access (ZTNA) system provides secure access to applications hosted on a customer premises. The ZTNA system is modified to facilitate distributed and/or cloud-based deployments of components for a control plane and a data plane, all collectively supporting a network-accessible front end for the customer's locally hosted applications.

A cloud computing platform provides zero trust network access as a service to customers that maintain applications on-premises, and a zero trust network access appliance at the customer premises that couples the on-premises applications to the cloud computing platform. A customer may host multiple instances of the appliance in order to support scalable access, where each instance creates a separate secure tunnel to the cloud computing platform. In this context, when a new appliance authenticates a new secure tunnel, information such as a connector name, customer, and port for the tunnel may be shared on a control plane for the computing platform to facilitate programmatic load balancing within the cloud computing platform.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 12 shows a method for dynamic routing of application traffic to ZTNA connectors.

FIG. 13 shows a method for scaling tunnels for zero trust network access appliances.

DETAILED DESCRIPTION

Figure 1:
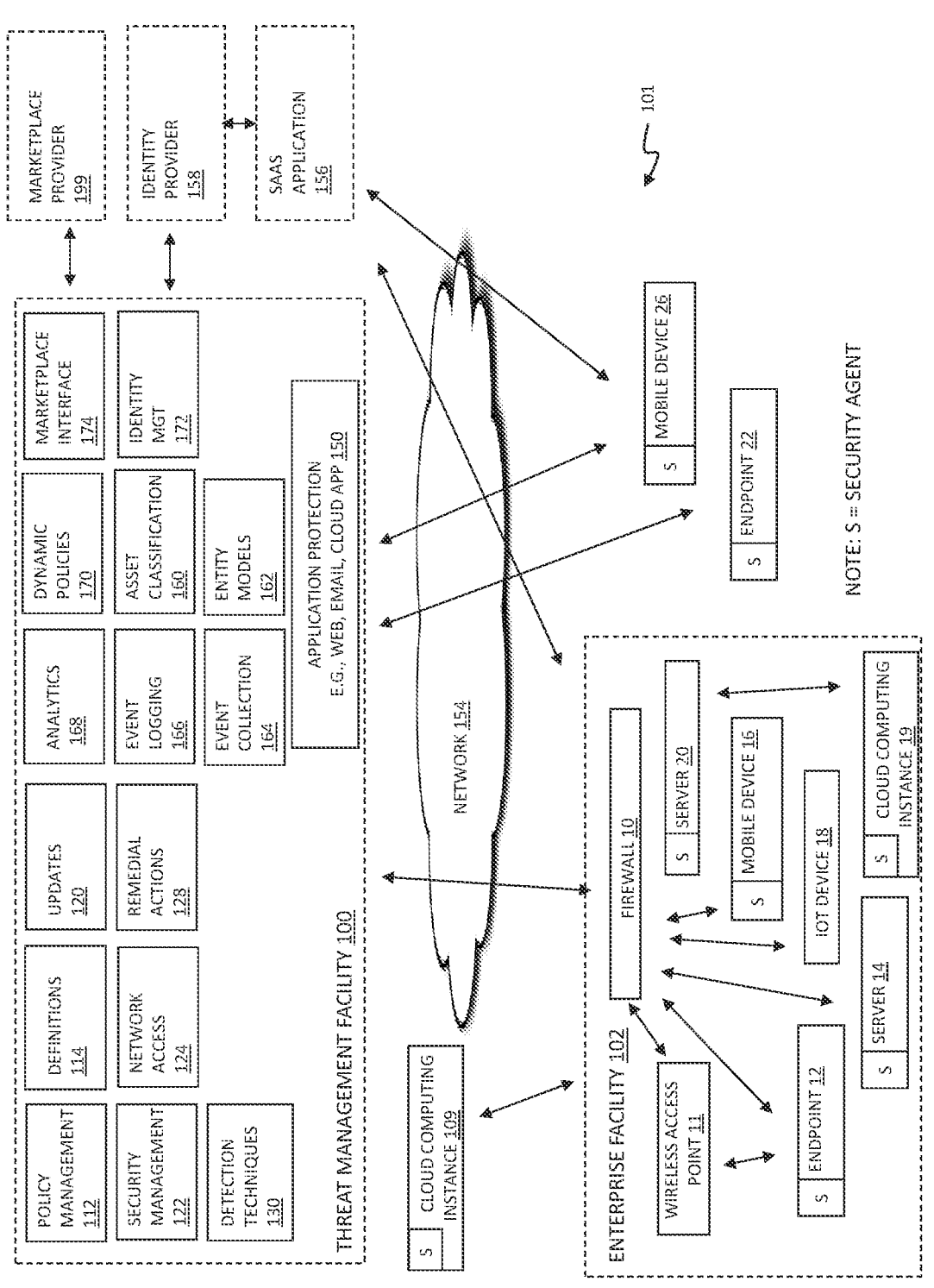
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network.

Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, the threat management facility 100 may include, or may be connected to a security agent S such as a local security agent deployed on one or more other entities within the threat management system 101. The facilities of the threat management facility 100, and/or a security agent S therefor, may be deployed on the same physical hardware or logical resource as a gateway for an enterprise facility 102, a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 90 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a blacklist, an allowed list, a whitelist, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 9, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 92 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 92 and policy management facility 112 may push information to the enterprise facility 102 network and/or the compute instances 10-26, the enterprise facility 102 network and/or compute instances 10-26 may pull information from the security facility 92 and policy management facility 112, or there may be a combination of pushing and pulling of information. For example, the enterprise facility 102 network and/or compute instances 10-26 may pull update information from the security facility 92 and policy management facility 112 via the update facility 120, an update request may be based on a time period, by a certain time, by a date, on demand, or the like. In another example, the security facility 92 and policy management facility 112 may push the information to the enterprise facility's 102 network and/or compute instances 10-26 by providing notification that there are updates available for download and/or transmitting the information. In an embodiment, the policy management facility 112 and the security facility 92 may work in concert with the update management facility 90 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able to discover threats that were not detected on one of the compute instances 10-26, or policy violation, such transmittal of information that should not be communicated unencrypted.

The threat management facility 100 may control access to the enterprise facility 102 networks. A network access facility 94 may restrict access to certain applications, networks, files, printers, servers, databases, and so on. In addition, the network access facility 94 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 94 may determine if a given compute instance 10-22 should be granted access to a requested network location, e.g., inside or outside of the enterprise facility 102. Network access facility 94 may determine if a compute instance 22, 26 such as a device outside the enterprise facility 102 may access the enterprise facility 102. For example, in some cases, the policies may require that when certain policy violations are detected, certain network access is denied. The network access facility 94 may communicate remedial actions that are necessary or helpful to bring a device back into compliance with policy as described below with respect to the remedial action facility 128. Aspects of the network access facility 94 may be provided, for example, in the security agent of the endpoint 12, in a wireless access point 11, in a firewall 10, as part of application protection 150 provided by the cloud, and so on.

In an embodiment, the network access facility 94 may have access to policies that include one or more of a block list, an allowed list, an unacceptable network site database, an acceptable network site database, a network site reputation database, or the like of network access locations that may or may not be accessed by the client facility. Additionally, the network access facility 94 may use rule evaluation to parse network access requests and apply policies. The network access rule facility 94 may have a generic set of policies for all compute instances, such as denying access to certain types of websites, controlling instant messenger accesses, or the like. Rule evaluation may include regular expression rule evaluation, or other rule evaluation method (s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and infer-ences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 92 may take any steps or deploy any measures suitable for addressing a detection of a threat, potential threat, policy violation or other event, code or activity that might compromise security of a computing instance 10-26 or the enterprise facility 102.

Figure 2:
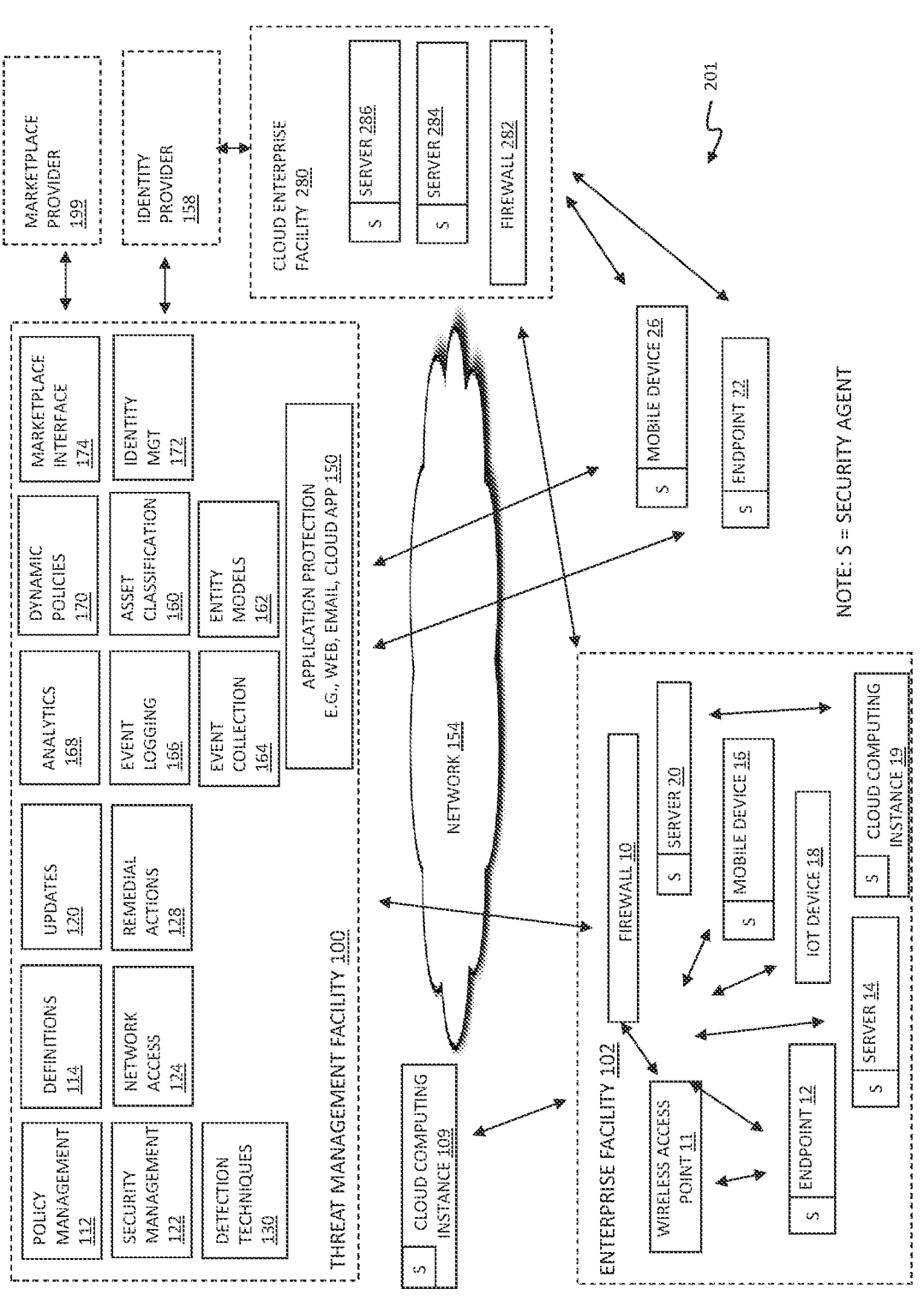
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
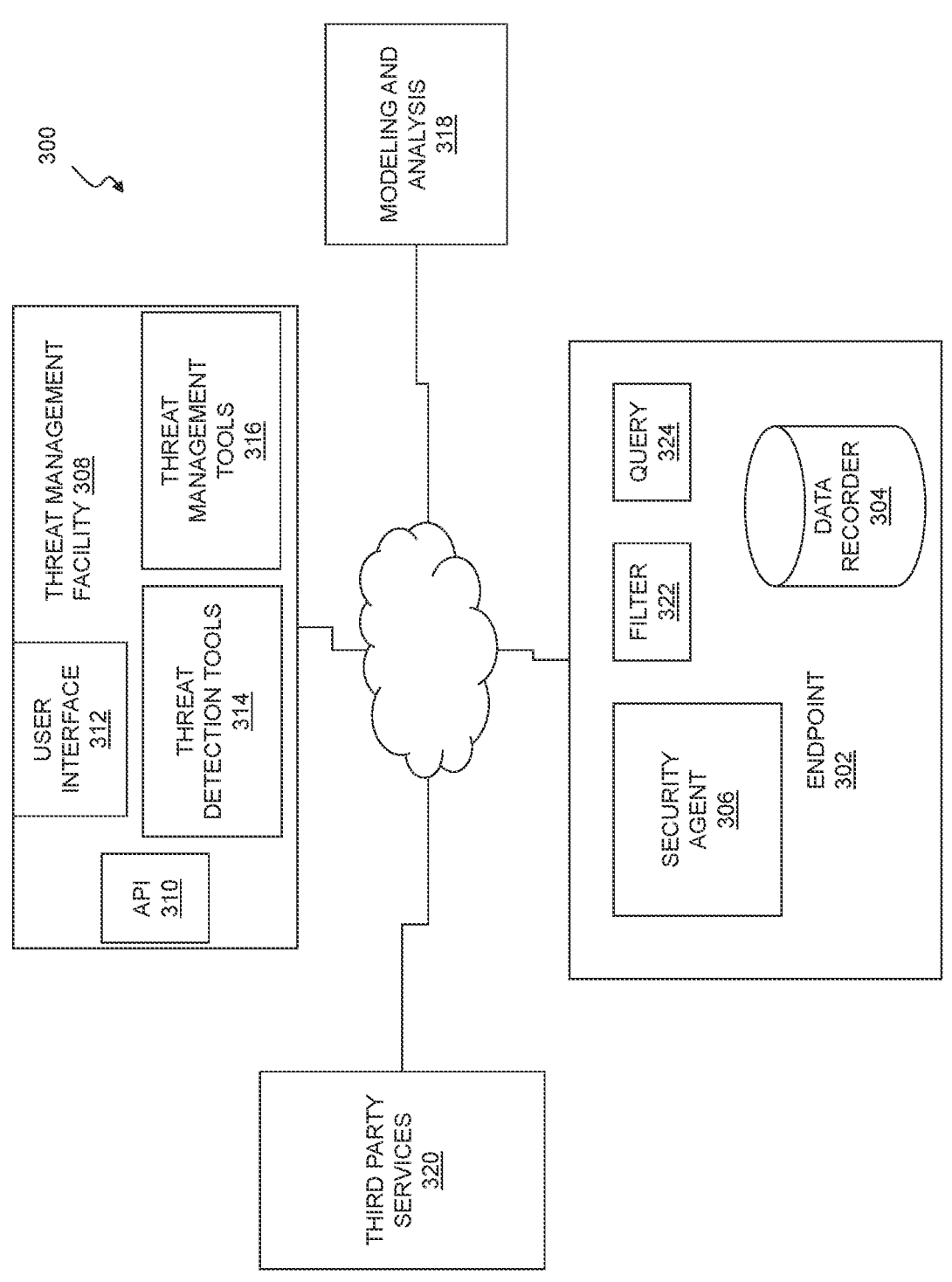
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting interme diate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or mali cious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security com ponents on the endpoint 302, maintaining policy compli ance, and communicating with the threat management facil ity 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic commu nications or files, monitor behavior of computing objects such as executables, and so forth. The security agent 306 may, for example, apply signature-based or behavioral threat detection techniques, machine learning models (e.g., models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and com puting resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus, for example, the threat man agement facility 308 may request all changes to the registry of system information for the past forty eight hours, all files opened by system processes in the past day, all network connections or network communications within the past hour, or any other parametrized request for activities moni tored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
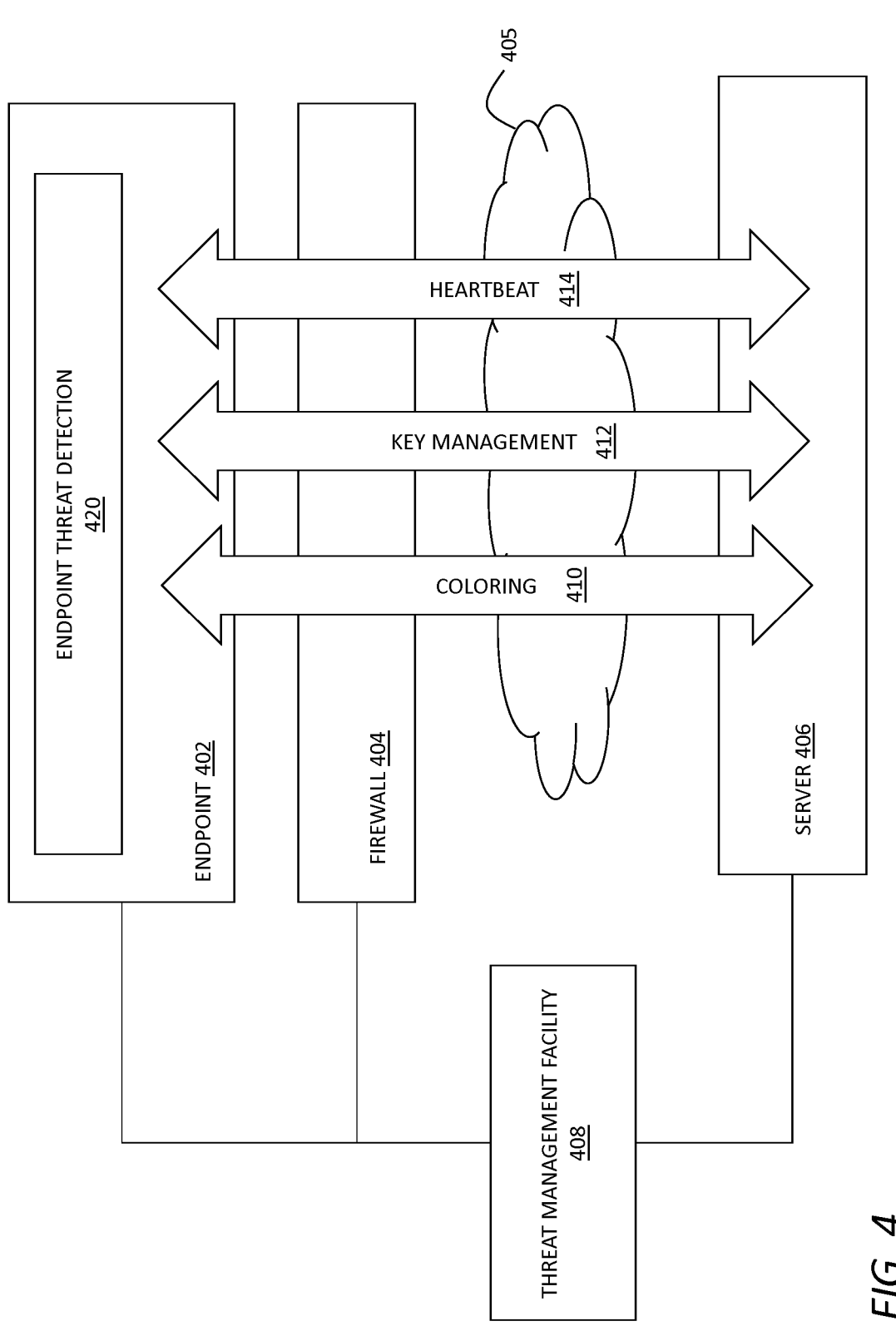
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

Figure 5:
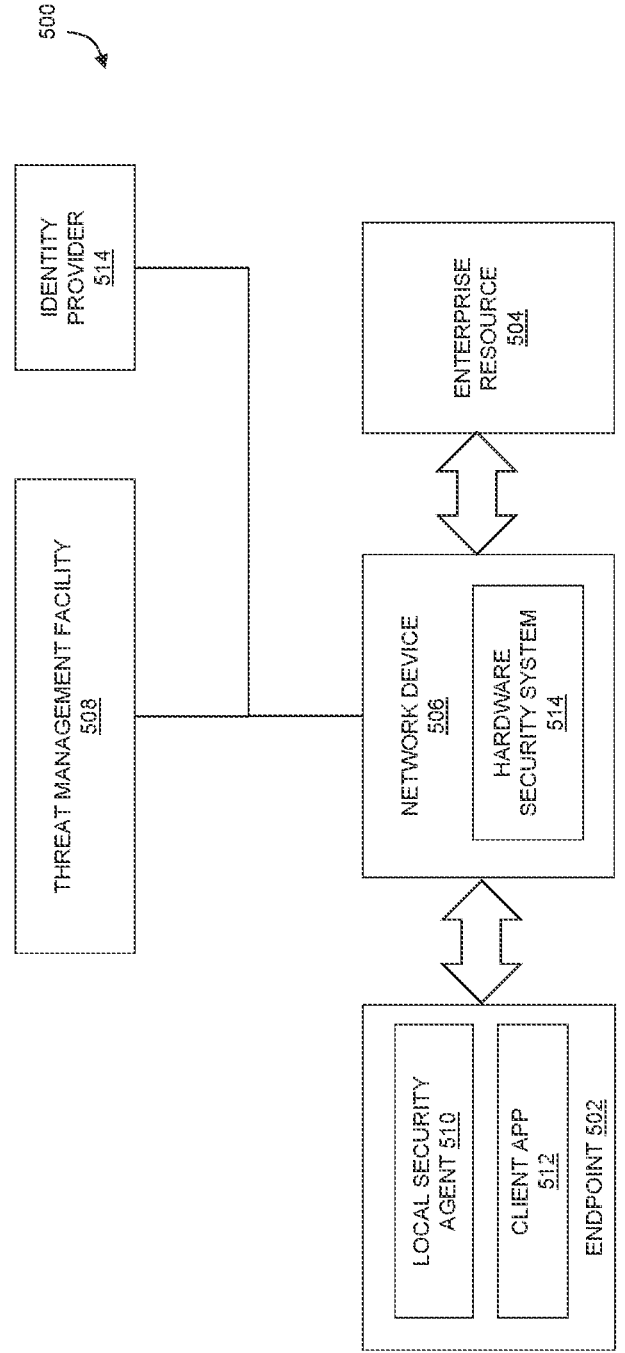
FIG. 5 shows a threat management facility in a zero trust network access (ZTNA) environment.

FIG. 5 shows an enterprise network. In the enterprise network 500, an endpoint 502 may access an enterprise resource 504 through a network device 506, with security for the enterprise network managed by a threat management facility 508. In general, the enterprise network 500, the endpoint 402, the enterprise resource 504, the network device 506, and the threat management facility 508 may be any of those described herein.

The endpoint 502 may include any of the endpoints, endpoint devices, compute instances, or other physical or virtual computing devices described herein. In one aspect, a user of the endpoint 502 may request or seek to use the protected resource 504. The endpoint 502 may execute a local security agent 510, also as described herein, that locally manages security of the endpoint 502 in cooperation with the threat management facility 508. The endpoint 502 may also execute a local application such as a web browser or other application that accesses (or requests access to) the enterprise resource 504 through the network device 506.

The enterprise resource 504 may generally include any application, database, data store, file server, web server, mail server, or other resource supported by an enterprise, including an application or the like locally hosted on customer premises, one or more remote resources, or any combination of these. In one aspect, the enterprise resource may include a protected resource such as an application secured by password access, and/or a zero trust network access resource accessible through a zero trust network access gateway for the enterprise network.

The network device 506 may include any network device such as a firewall, switch, wireless access point, gateway, and so forth. In general, services operating on the network device 504 may support network connectivity among other devices (including access to the enterprise resource 504), and may support enterprise threat management through a connection to the threat management facility 508 and the local security agent 510 executing on the endpoint 502. The network device 506 may advantageously incorporate a hardware security system 514 such as a dedicated chip or circuit that stores data for authenticating the network device 506 to other devices, or otherwise securing operation of the network device 506 or verifiably asserting an identity of the network device 406. For example, Trusted Platform Module (TPM) is an international standard for a dedicated hardware cryptoprocessor that specifies an architecture, security algorithms, cryptographic primitives, root keys, authorization standards, and so forth that can be used for authentication. A TPM cryptoprocessor securely stores device-specific key material that is bound to a device at manufacture. The cryptoprocessor may also supports various cryptographic functions (e.g., encryption, decryption, hashing, key generation, random number generation, etc.) for remote attestation, so that the cryptoprocessor can reliably authenticate the device to other entities on demand. In the context of a secure enterprise network, the hardware security system 514 permits the network device 506 to authenticate to the threat management facility 508 automatically or semi-automatically when the network device 506 is physically connected to a customer's enterprise network. While the Trusted Platform Module standard provides a useful and highly secure, hardware-based security system, any other standardized, proprietary, and/or commercial hardware-based security system may also or instead be used as the hardware security system 514, provided the system offers suitable security, and, where applicable, provided the system supports remote authentication of the network device 506, e.g., from the threat management facility 508. For example, Platform Trust Technology from Intel™ and PSP fTPM from AMD™ provide similar functions and security to the TPM standard, and may be used to provide a hardware security system 514 as contemplated herein.

In one aspect, the network device 506 may include a zero trust network access (ZTNA) gateway that provides secure connectivity for user devices, such as the endpoint 502, to a protected resource such as the enterprise resource 504. The zero trust network access gateway, may, for example, support client access via a WebSocket service, and/or agentless access using a reverse proxy. The zero trust network access gateway may facilitate establishing and maintaining a connection with an endpoint-deployed local security agent 510 that is adapted for operation in a ZTNA environment. In general, the zero trust network access gateway may require authentication of endpoints 502 on a resource-by-resource basis. To this end, the system 100 may include an identity provider 514 that supports, e.g., secure, credential-based authentication of entities within the zero trust network system 500.

The threat management facility 508 may include any of the threat management facilities or other security resources described herein. The threat management facility 508 may generally support security of the enterprise network 500, including a range of administrative services such as configuring gateways, managing protected resources, configuring the identity provider 514, monitoring ZTNA appliances, creating notifications, generating reports, managing users, and the like. In one aspect, the threat management facility 508 may support security by detecting new network hardware such as the network device 506 when it is added to the enterprise network 500, and by authenticating the new network hardware, such as the network device 506, before permitting network traffic through the network device 506.

In one aspect, the network device 506 may itself be an endpoint 502 that is managed by the threat management facility 508. It should also be noted that an endpoint 502 other than a network device, such as a client device or other end user device, may also include a hardware security system 514 that can be used to authenticate an end user or an end user device to the threat management facility 508 (e.g., for delivery of security services or for entry into a managed enterprise network), or to authenticate to a ZTNA gateway or the enterprise resource 504 (e.g., for zero trust network access to the enterprise resource 504 by a user of the device). Thus, notwithstanding specific embodiments described herein, the hardware security system 514 may generally be used to authenticate new hardware securely and reliably when it is added to the enterprise network 500, or to authenticate a device or device user when requesting access to network resources, or any combination of these.

In one aspect, the local security agent 510 may provide a secure heartbeat, such as any of the secure heartbeats described herein. In the context of network access, the secure heartbeat may be used to assert an identity of a device, a device user, or a security posture of the endpoint 502 in order to facilitate access to the enterprise resource 504, security services of the threat management facility 508, or other network resources associated with the enterprise network 500.

Figure 6:
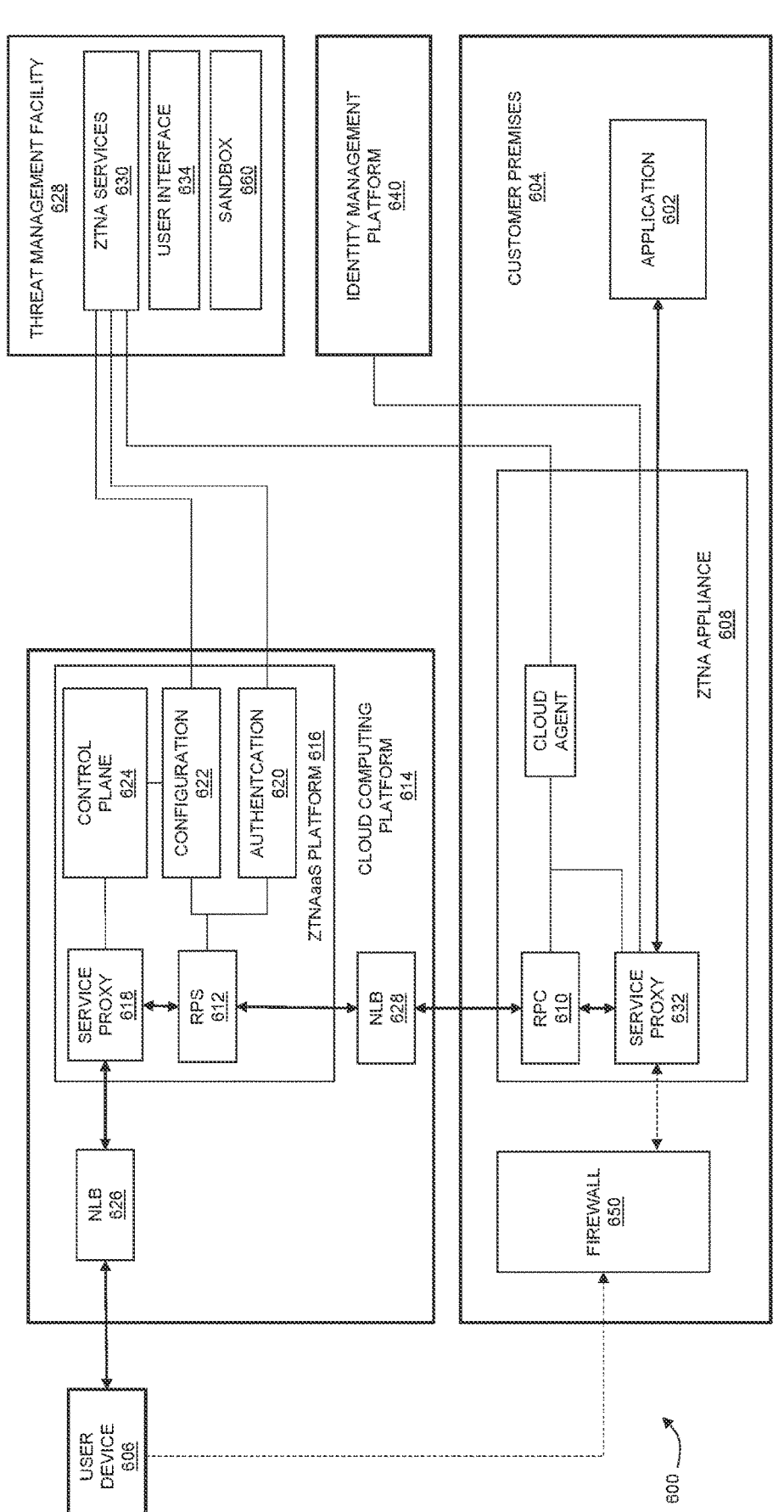
FIG. 6 shows a zero trust network access environment using a zero trust network access appliance.

FIG. 6 shows a zero trust network access environment using a zero trust network access (ZTNA) appliance. In general, a portion of the infrastructure for zero trust network to an application may be deployed as a cloud-based service remotely from the customer premises where an application is hosted. By connecting this cloud-based infrastructure to a ZTNA appliance on the customer premises through a secure tunnel or the like, the application hosted behind the ZTNA appliance on the customer premises can then be accessed externally as a ZTNA application via the cloud-based service without the customer premises opening a firewall to public networks or otherwise exposing potential attack surfaces to the customer premises.

In general, a system 600 supporting the zero trust network access environment may include an application 602 hosted on a customer premises 604, along with a ZTNA appliance 608 hosted on the customer premises 604. The system 600 may include any of the ZTNA gateways, ZTNA applications, endpoints, and threat management facilities described herein, as well as any of the subcomponents or modules thereof. The ZTNA appliance 608 may be configured to provide zero trust network access to the application 602.

In the system 600, a cloud computing platform 614 hosted remotely from the customer premises 604 may be configured to provide a point of access to a device such as the user device 606 operated by a user who is associated with the customer premises 604. To this end, the cloud computing platform 614 may host a zero trust network as a service (ZTNAaaS) platform 616 managed by the threat management facility 628 and configured to provide a network access point for ZTNA applications remotely hosted on the customer premises 604. The ZTNAaaS platform 616 may, for example, includes a reverse proxy server 612 for securely connecting to the customer premises 604 and a service proxy 618 providing a network access point. The ZTNAaaS platform 616 may also include an authentication server 620, a configuration service 622, and control plane services 624. The cloud computing platform 614 hosting the ZTNAaaS platform 616 may also include other services and resources, such as an interface to external Domain name system resources, domain hosting resources, data caches (e.g., for customer configuration information), cloud computing resources (e.g., for managing compute instances, monitoring the ZTNAaaS platform 616, and so forth), and network resources. For example, the cloud computing platform 614 may include a number of network load balancers such as a first network load balancer 626 and a second network load balancer 628 that distribute traffic (with the user device 606 and/or the customer premises 604) across multiple targets, such as different compute instances hosted on the cloud computing platform 614.

A threat management facility 628, such as any of the threat management facilities described herein, may host a number of ZTNA services 630 for configuring and managing resources of the ZTNAaaS platform 616, thus providing a control plane for zero trust network access to the application 602 hosted on the customer premises 604. The ZTNA services 630 may be deployed, e.g., using any suitable microservices architecture or other environment suitable for scalable deployment or the like. In one aspect, the ZTNA services 630 may store configuration information such as application information, gateway information, security and use policies, identity and access management information (including identity providers, if/as appropriate), and so forth. The ZTNA services 630 may also support many of the functions described herein, such as creating alias fully qualified domain names for connectors and agentless applications, validating domain ownership, and so forth. The threat management facility 628 may be hosted remotely from the cloud computing platform 614 and/or customer premises 604, and may be coupled in a secure communicating relationship with the cloud computing platform 614 and/or customer premises 604. In general, the threat management facility 628 may provide security services for the customer premises 604 (and external enterprise users) as described herein. The threat management facility 628 may also provide a user interface 634, such as an administrative interface for administrative configuration of the zero trust network access appliance 608, or more generally for use in configuring the ZTNA environment as further described herein. The user interface 634 may also support management of any of the other security and ZTNA services described herein.

The cloud computing platform 614 may generally provide a configurable data plane for managing ZTNA connections from a user device 606 to the application 602. To provide a network-facing access point, the service proxy 618 on the ZTNAaaS platform 616 may generally be configured to couple the user device 606 to the application 602 hosted on the customer premises 604, e.g., by directing an incoming request from the user device 606 via the reverse proxy server 612 to a secure tunnel coupled to the reverse proxy client 610 at the customer premises 604, where a second service proxy 632 on the ZTNA appliance 608 can authenticate a user at the user device 606 for access to the application 602 using any suitable authentication protocols, authentication factors, procedures, credentials, and so forth. In one aspect, a secure heartbeat from the user device 606, such as any of the heartbeats described herein, may be used as an authentication factor for authenticating to the ZTNA appliance 608, or otherwise asserting an identity of the user or security posture of the user device 606 to support the use of secure services, connections, and so forth.

In one aspect, the cloud computing platform 614 provides a data plane for zero trust network access to the application 602 hosted on the customer premises 608. To this end, the cloud computing platform 614 may support an addressable access point at the service proxy 618, which is connected by a data path through the reverse proxy server 612 to the reverse proxy client 610 on the customer premises 604, and from there to the application 602. In one aspect, the administrative interface of the threat management facility 628 may be configured to receive a Domain name system record identifying an address for the cloud computing platform 604, e.g., for accessing an associated application 602. Based on address information provided through the administrative interface, or where appropriate, information that is automatically generated, the cloud computing platform 614 may then provide a network address available from a public network for zero trust network access to the application 602. The cloud computing platform 614 may also or instead provide a fully qualified domain name for zero trust network access to the application.

Returning to the customer premises 604, the ZTNA appliance 608 may generally be configured, e.g., by a service proxy 632 managed by the ZTNA services 630, to support ZTNA access to the application 602. In this capacity, the ZTNA appliance 608 may authenticate users who request access to the application 602 from the user device 606. Users may be authenticated using any suitable authentication techniques or protocols. For example, the ZTNA appliance 608 may authenticate users for access to the application 602 with a username and password, such as a username and password managed by the customer premises 604 or an identity management platform 640 such as a third party identity management platform external to the customer premises 604, or an identity management platform hosted by the threat management facility 628 (which may also be a third party relative to the customer). In one aspect, the ZTNA appliance 608 may be configured to authenticate the user with two or more authentication factors including, by way of non-limiting examples, a biometric authentication factor, a hardware token authentication factor, an identifier such as an electronic mail or instant messaging address, a heartbeat from the user device 606 (e.g., a heartbeat from a security agent executing on the user device 606), or any other authentication factor associated with a user that the user can employ to assert identity to the ZTNA appliance 608. The authentication factors and supporting credentials may in general be managed by the customer premises 604, the threat management facility 628, the identify management platform 640, or any combination of these.

In order to securely couple the customer premises 604 to the cloud computing platform 614 for ZTNA delivery of the application 602, the ZTNA appliance 608 may include a reverse proxy client 610, and may be configured to initiate a secure connection to a reverse proxy server 612 on the cloud computing platform 614 in order to operatively couple the application 602 hosted on the customer premises 604 through the cloud computing platform 614 to the user device 606 operated by the user. In general, the reverse proxy server 612 and the reverse proxy client 610 may be any client-server modules suitable for establishing a secure tunnel between the ZTNA appliance 608 on the customer premises 604 and the cloud computing platform 614 where a front end of the ZTNA data plane is hosted. For example, the reverse proxy server 612 and reverse proxy client may be a Fast Reverse Proxy Server and Fast Reverse Proxy Client based on an open source project for exposing a local resource behind a firewall or Network Address Translation device to the Internet by port forwarding, or any other server/client architecture for securely connecting resources across a public data network.

In operation, the reverse proxy client 610 may initiate outbound TLS connections or the like to the reverse proxy server 612, and then the reverse proxy server 612 can allocate a free port dynamically where the reverse proxy server 612 can listen for new connections from the ZTNA appliance 608. In one aspect, the reverse proxy server 612 can be configured to authenticate connections from the reverse proxy client 610, e.g., using the authentication server 620 of the ZTNAaaS platform 616. For example, when the reverse proxy client 610 makes an initial connection to the reverse proxy server 612, the reverse proxy server 612 may take a token supplied by the reverse proxy client 610, and request that the authentication server 620 validate the token. This may include a token from the threat management facility 628, a token from the identity management platform 640, a token from a hardware security system on the ZTNA appliance 608, or any other token or other secure, identifying information for verifiably asserting the identity of the ZTNA appliance 608, or a user of the ZTNA appliance 608, to the ZTNAaaS platform 616. The reverse proxy client 610 may also provide additional details, such as gateway details for the application 602, so that this information can be used to configure the ZTNAaaS platform 616. If the authentication token is validated by the authentication server 620, then a secure tunnel may be established. Otherwise, the connection may be terminated.

When a new connection is created, the reverse proxy server 612 may request configuration information from the configuration service 622, which can store Internet Protocol (IP) address information, port details, and other information for the reverse proxy server 612 and the ZTNA appliance 608 (including, e.g., a name of the application 602 being supported by the connection), and provide an OK response (HTTP 200) to the reverse proxy server 612 upon proper configuration. The service proxy 618 may then be configured through the control plane service 624, e.g., with data from the configuration service 622, to respond to requests for the application 602 received from a device such as the user device 606. In response to the OK response from the configuration service 622, the reverse proxy server 612 may initiate listening for new connections to the application 602 on a port for the service proxy 618 in the ZTNAAS platform 616. If no OK response is received from the configuration service 622, the connection to the reverse proxy client 610 may be terminated.

In general, the configuration service 622 may manage configuration information for the ZTNAaaS platform 616, e.g., by synchronizing data on the ZTNAaaS platform 616 as customers or administrators make changes at the threat management facility 628, and by notifying the control plane service 624 of changes. The configuration service 622 may monitor the ZTNA services 630 for configuration changes, e.g., by subscribing to an Amazon™ SNS Topic in an AWS environment, or otherwise subscribing to a communication channel, listening for corresponding events, or otherwise communicating with the ZTNA services 630 to receive updates to configuration information. The configuration service 622 may, for example, be configured as a server plugin for the reverse proxy server 612 so that the reverse service proxy 612 issues a request to the configuration service 622 when a reverse proxy client 610 makes a connection. As a part of this request, the reverse proxy server 612 may provide information to the configuration service 622 about the connection to the reverse proxy client 610 such as the Internet Protocol address, port, gateway identifier, and tenant (e.g., customer) identifier. Using these details, the configuration service 622 may fetch information for the connection and cache the data in a suitable data store on the cloud computing platform 614. For example, the configuration service 622 may fetch tenant (or customer) information, gateway information, information for applications configured for the gateway, customer uploaded certificates, heartbeat certificates, endpoint certificate and/or fingerprint lists, domain ownership details, and so forth.

The application 602 may be any application hosted on the customer premises 604 or any of the other enterprise resources described herein including without limitation databases, data management software, media players, connectivity applications or browsers, security programs, office productivity tools, games, or other general or business-specific applications. The application 602 may, for example, be an agentless application, e.g., an application that does not require services or processes running in the background on a user device 606, and that typically requires an account for access to data and other local resources. The application 602 may also or instead include an agent-based application. For agentless applications, the service proxy 618 may differentiate customers using domain names for gateways and applications (where the same domain name cannot be used by two different customers). In this case, Mutual Transport Layer Security (mTLS) authentication, or any other suitably secure authentication, may be performed by the service proxy 618. For agent-based applications, the service proxy 618 may be provided with customer certificates, which can be sent to a user's browser/agent for use, along with other certifying material such as a heartbeat, a fingerprint, user credentials, certificates and the like, as appropriate, in connecting to the service proxy 618, which may be configured with corresponding routes to forward associated requests to tunnels that have been established for specific services/applications.

The user device 606 may generally include any of the endpoints or other compute instances or computing devices described herein. In one aspect, the user device 606 may include a local security agent, such as any of the local security agents described herein, configured to locally manage security of the user device 606, connect to the threat management facility for remote management of device security, generate a heartbeat indicating a security state or other information about the user device 606, and so forth.

The service proxies, such as the service proxy 618 for the ZTNAaaS platform 616 or the service proxy 632 for the ZTNA appliance 608, may be any suitably configurable agents, modules, code segments, containers, computing objects, or the like. In a microservices architecture, a service proxy may more specifically operate as an intermediary between microservices application components, and provide a connection for clients to request various services. For example, Envoy is an open source edge and service proxy designed for use in cloud computing environments. Envoy provides a high performance distributed proxy for use in single services/applications, as well as large microservice architectures, and offers features such as API's for dynamic configuration, a small memory footprint, load balancing, and good observability, that make Envoy a good choice for use in the service proxies described herein. However, any other edge proxy or service proxy architecture, or other distributed computing framework suitable for scalable use and remote management in a cloud computing environment may also or instead be used to deploy and manage service proxies (and other resources) as described herein.

In one aspect, the ZTNA appliance 608 may be user-configurable to select between a gateway mode and a cloud mode. In the cloud mode, the ZTNA appliance 608 may be configured as a ZTNA connector that provides access to the application 602 through the cloud computing platform 614 as generally described herein. That is, the ZTNA appliance 608 may be configured to make an outbound connection to the reverse proxy server 612 of the cloud computing platform, authenticate to the reverse proxy server 612 with the authentication server 620, establish a secure tunnel between the zero trust network access appliance 608 (at the customer premises 604) and the reverse proxy server 612 (at the cloud computing platform 614), and use the secure tunnel to provide zero trust network access to the application 602 hosted on the customer premises 604 by the user of the user device 606. In this mode, the ZTNA connector may authenticate a user that accesses the application 602 through the secure tunnel to the cloud computing platform 614, e.g., by using authentication services of the cloud computing platform 614, the identity management platform 640, the threat management facility 628, or any other source(s) of trusted authentication services for the customer premises 604.

A user-configurable ZTNA appliance 608 may also be configured or reconfigured, e.g., by a setting controlled through the user interface 634 of the threat management facility 628, to operate in a gateway mode. In this gateway mode, the ZTNA appliance 608 may be configured as a ZTNA gateway to provide access to the application 602 through a firewall 650 hosted on the customer premises 604, or connected between the customer premises 604 and an external data network. In this latter configuration, the gateway mode, the user device 606 would access the application 602 through the firewall 650 at the customer premises 604, and through the ZTNA appliance 608, which will operate as a ZTNA gateway to authenticate the user of the user device 606 for zero trust network access. Thus more generally, the ZTNA appliance 608 may be user-configurable by the customer (e.g., using the user interface 634 of the threat management facility 628) to operate as either (a) a zero trust network access gateway exposed to a public network through a firewall 650 for the customer premises 604, or (b) a zero trust network access connector coupled through a secure tunnel to a data plane hosted on the cloud computing platform 614, and accessible via a service proxy 618 exposed to the public network (or other network used by the user device 606). This approach advantageously permits a customer who is managing the customer premises 604 to select whether and when to use a firewall rather than a cloud-based data plane, and/or to deploy different applications using any combination of the foregoing. This also permits the customer to choose between access protocols, e.g., where the ZTNA gateway uses a Session Description Protocol (SDP) interface and the ZTNA connector uses a Software-as-a-Service (SaaS) interface.

According to the foregoing, a system for zero trust network access to a customer application, as described herein, may include an application hosted on a customer premises; a threat management facility configured to manage security for the customer premises; a cloud computing platform hosted remotely from the customer premises, the cloud computing platform configured to provide a point of access to a device operated by a user associated with the customer premises, and a zero trust network access appliance hosted on the customer premises. The cloud computing platform may include a service proxy configured to couple the device to the application hosted on the customer premises, a reverse proxy server connected to the service proxy, the reverse proxy server configured to securely connect to the customer premises, and an authentication server securely coupled to the threat management facility and configured to create a secure tunnel to the customer premises by authenticating a secure connection to the reverse proxy server. The zero trust network access appliance may be configured to initiate the secure connection to the reverse proxy server, and the zero trust network access appliance configured to operatively couple the application hosted on the customer premises through the cloud computing platform to the device operated by the user.

In another aspect, a system for zero trust network access to a customer application, as described herein, may include an application hosted on a customer premises; a cloud computing platform remote from the customer premises, the cloud computing platform providing a cloud-based data plane for zero trust network access to the application; a zero trust network access appliance hosted on the customer premises, the zero trust network access appliance locally coupled to the application and remotely coupled to the cloud computing platform; and a secure tunnel between the cloud computing platform and the zero trust network access appliance, the zero trust network access appliance configured to provide zero trust network access to the application from the cloud computing platform through the secure tunnel.

The system 600 may include a sandbox for testing components such as service proxies. As described herein, service proxies that provide an access point for applications through a data network may become increasingly complex as additional customers and applications are added. In order to ensure that a service proxy will function properly before deployment, a newly configured service proxy may advantageously be tested in a sandbox environment. In general, this may include any programming environment that simulates usage on the ZTNAaaS platform 616 and cloud computing platform 614 and permits testing and validation in that environment before the service proxy is deployed live. While the sandbox is depicted as residing on the threat management facility 628, it will be understood that the sandbox may also or instead execute on the cloud computing platform 614 or some other separate environment configured for isolated testing of cloud computing components.

It will be understood that, while FIG. 6 depicts single entities such as a single user device 606, a single application, 602, a single ZTNA appliance 608, a single reverse proxy server/client, and so forth, any number of users, applications, ZTNA appliances, and so forth, may be supported by the architecture described herein. This includes multiple instances of the same application, e.g., to scale access to an application, or multiple different applications hosted by a customer. This may also or instead include multiple, unaffiliated customer premises and customers using the cloud computing platform as a multi-tenant resource, as well as multiple cloud computing platforms collectively supporting a data plane for one or more customers or applications. Thus, any number of entities, connections, devices, servers, appliances, and the like may be used consistent with this disclosure, unless a specific number is explicitly provided or otherwise clear from the context. A number of additional features, configurations, and uses of the ZTNA environment are now provided.

Figure 7:
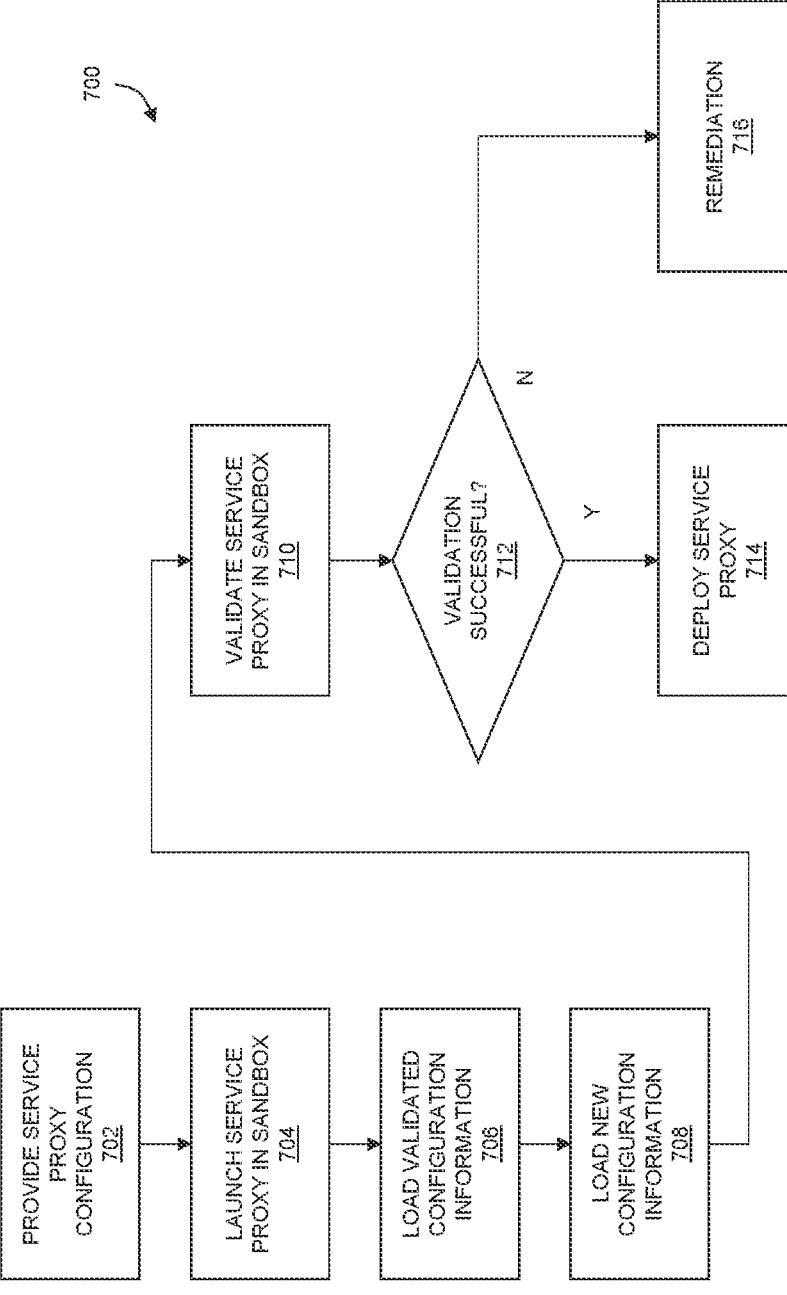
FIG. 7 shows a method for validation of ZTNA configuration for a multi-tenant proxy environment.

FIG. 7 shows a method for validation of ZTNA configuration for a multi-tenant proxy environment. In general, a cloud-based platform for zero trust network access services provides zero trust network access as a service for multiple customers in a multi-tenant architecture. As a service proxy or the like becomes increasingly complex with the addition of new customers and applications, it becomes increasingly possible for programming conflicts, inconsistencies, or the like to impair operation of the service proxy, particularly where configuration information from one source (e.g., a user interface of a threat management facility) is being converted into an executable form for use by a service proxy or the like. In this context, the configuration for a new ZTNA application may advantageously be validated as an update to a preexisting service proxy that has a known, good configuration before release of the new ZTNA application for access through a public network by the cloud-based platform. As a significant advantage, this approach mitigates inadvertent conflicts or instability in a service proxy that supports other applications and customers. In general, the cloud-based platform, customers, customer premises, service proxies, applications, and other components discussed below may be any as described herein.

As shown in step 702, the method 700 may begin with providing configuration information for a service proxy, e.g., by configuring a service proxy in an administrative interface or other user interface, or otherwise receiving a customer configuration for a service proxy for deployment on a cloud computing platform to provide zero trust network access to an application hosted on a customer premises. This may include providing the configuration information, e.g., through a user interface of a threat management facility that hosts a control plane for managing the zero trust network access through the ZTNA services described herein. This may also or instead include providing configuration information for the service proxy such as a fully qualified domain name for the application or any other suitable network address information for accessing the application through a data network. The configuration information may also or instead include a fully qualified domain name for a zero trust network access appliance that provides access to the application. In another aspect, the configuration information may include a digital certificate, a digitally signed certificate, or other key material for authenticating the application to a user, or otherwise securely managing the application and access thereto.

As shown in step 704, the method 700 may include launching a first instance of the service proxy in a sandbox environment such as any of the sandboxes described herein. In one aspect, the service proxy may include an edge proxy positioned on an edge of the cloud computing platform and coupled to a public network such as the Internet or any other data network that might be used by a user device to access a ZTNA application.

As shown in step 706, the method 700 may include loading validated configuration information into the first instance of the service proxy for one or more other applications previously validated in the sandbox environment. This provides a known, working configuration of a service proxy for testing. This may, for example, include a configuration for one or more other applications, such as at least one application hosted by a different tenant of the cloud computing platform than a customer who is configuring the service proxy. As a significant advantage, this facilitates the identification and resolution of addressing or routing conflicts where multiple tenants are using a single cloud computing platform 614 for cloud-based ZTNA access.

As shown in step 708, the method 700 may include loading new configuration information, such as by loading the configuration information for the application from step 702 into the first instance of the service proxy. In this manner, the service proxy may be incrementally updated from a known, working configuration to a new configuration that supports one or more new applications that a customer wishes to deploy as ZTNA applications through the ZTNAaaS platform.

As shown in step 710, the method 700 may include validating proper operation of the service proxy with the new configuration information, e.g., by testing the first instance of the service proxy for proper operation in the sandbox environment. Testing may, for example, include at least confirming that the first instance of the service proxy is executing and responsive. Testing may also or instead include confirming that the first instance of the service proxy correctly responds to a request for the application for which new configuration information was provided. Any number and type of tests may also or instead be performed. For example, testing the first instance of the service proxy for proper operation may include requesting the configuration information for the application from the first instance of the service proxy, or requesting configuration information for one or more other applications supported by the first instance of the service proxy. Other testing may, for example, including testing that the first instance of the service proxy responds to a request for access to each one of the applications supported by the first instance of the service proxy, or otherwise confirming responsiveness and proper operation thereof. In one aspect, this may include presenting a request to the service proxy in the testing environment, such as a request for an application, e.g., using a fully qualified domain name for the application or any other suitably addressed request in the testing environment.

As shown in step 712, it may be determined if the validation is successful. If the validation is successful, the method 700 may proceed to step 714 where, in response to validating proper operation of the first instance of the service proxy in the sandbox environment, the method 700 may include loading the configuration information for the application into a second instance of the service proxy executing on the cloud computing platform and coupled to a public network. This may, for example include updating the second instance of the service proxy using the ZTNA services of a threat management facility and the configuration services of a ZTNAaaS platform as described herein.

The second instance of the service proxy may be coupled to other components of a system to support ZTNA access as described herein. For example, the second instance of the service proxy may be coupled to a zero trust network access appliance hosted on a customer premises in order to access an application hosted on the customer premises. In one aspect, the service proxy may be coupled to the zero trust network access appliance through a secure tunnel. The second instance of the service proxy may also or instead be coupled to the zero trust network access appliance through a reverse proxy server. In one aspect, the second instance of the service proxy may execute on a cloud computing platform to provide service proxies for the application according to the validated configuration information. The second instance of the service proxy may support multiple applications, customers, and users. For example, the second instance of the service proxy may be coupled to a public network, such as the Internet or any other data network, through a network load balancer to provide a scalable network front end. The second instance of the service proxy may also or instead support one or more other applications associated with one or more other tenants of the cloud computing platform. More generally, the second instance of the service proxy (and/or the first instance of the service proxy) may be configured to support access to any number of different applications, including multiple applications for a single customer, applications for two or more different customers, or any combination of these.

As shown in step 716, where the validation is not successful, the method 700 may include initiating remedial action. This may include notifying an administrator, preventing deployment of the configuration, or any other suitable remediation. Where testing information is available from the sandbox, this may also include notifying a recipient of the specific nature of the failure, and where available, suggesting reconfigurations to address the failure.

In another aspect, a system described herein includes a customer premises hosting an application; a threat management facility configured to provide a user interface for receiving configuration information for zero trust network access to the application; a testing environment configured to test a service proxy for proper operation when loaded with the configuration information; and a cloud computing platform configured to host the service proxy, the cloud computing platform further configured to receive the configuration information for the application upon validation in the testing environment, and to provide zero trust network access to the application based on the configuration information.

The system may include a zero trust network access appliance hosted on the customer premises. The zero trust network access appliance may be configured to authenticate a user connecting to the application through the service proxy executing on the cloud computing platform. The system may test the service proxy in the testing environment by presenting a request for access to the application using a fully qualified domain name for the application.

Figure 8:
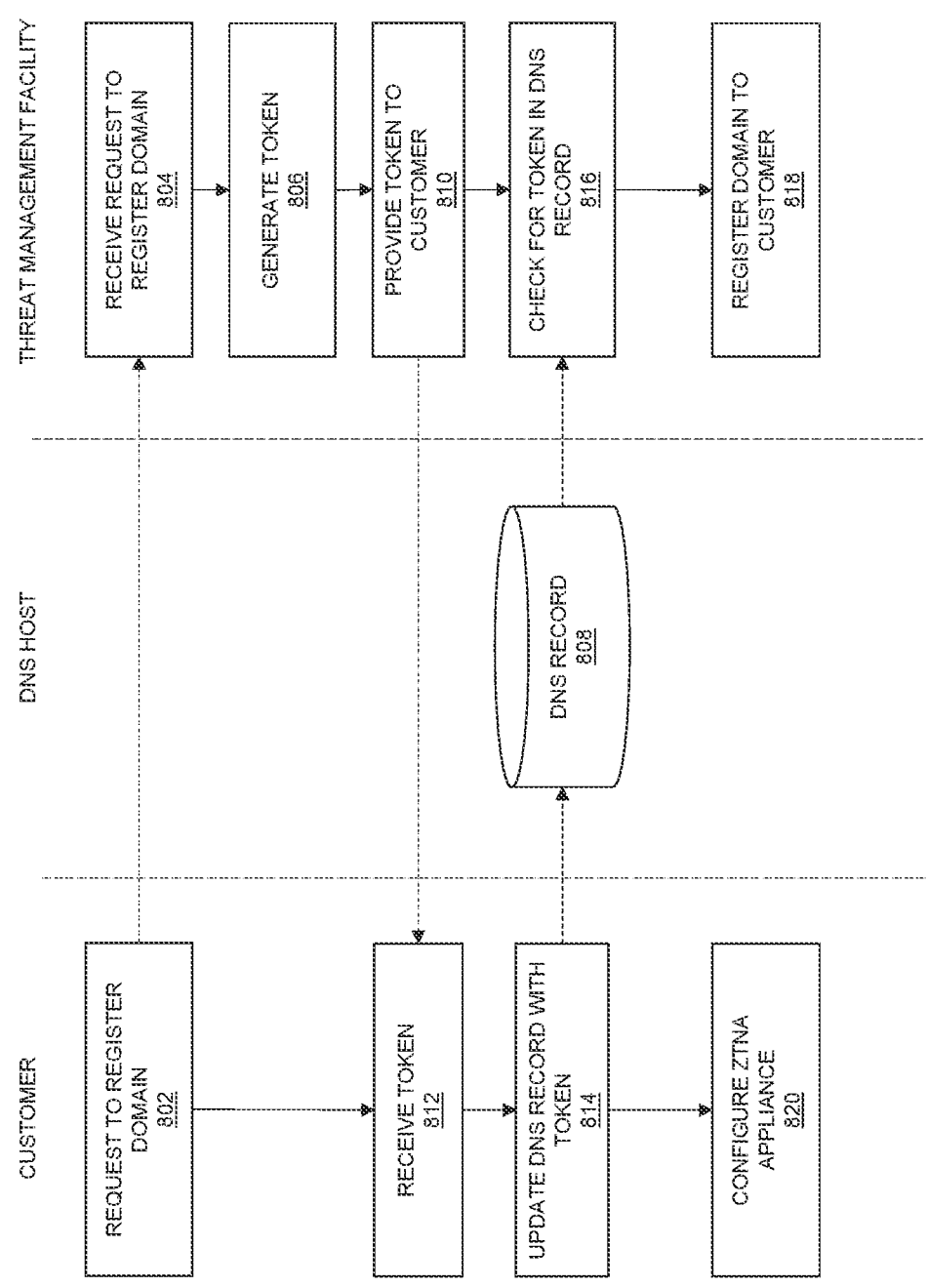
FIG. 8 shows a method for domain ownership verification for a ZTNA service platform.

FIG. 8 shows a method for domain ownership verification for a ZTNA service platform. In general, a cloud computing platform may provide zero trust network access as a service to a customer that maintains an application on-premises, as generally described herein. In this context, the customer may be required to demonstrate ownership of a domain before the cloud computing platform will provide access to the customer's on-premises application via the domain, thus preventing accidental addressing conflicts or intentional misuse of domains that are owned by other parties. In general, the cloud computing platform, customers, customer premises, applications, and other components discussed below may be any as described herein.

As shown in step 802, the method 800 may include initiating registration of an application on a ZTNAaaS platform, such as any of the ZTNAaaS platforms or supporting infrastructure described herein, e.g., by submitting a registration request to a user interface of a threat management facility.

As shown in step 804, the method 800 may include receiving a request from a customer to register a domain for zero trust network access to an application hosted on a customer premises. Receiving the request may, for example, include receiving the request at a user interface of a threat management facility or other console or management point for the ZTNAaaS platform. Receiving the request may more specifically include receiving a request from a customer that is hosting an application on a customer premises to register a domain for zero trust network access to the application through a service hosted on a cloud computing platform. The cloud computing platform may, for example, include a cloud-based zero trust network access platform providing zero trust network access as a service to one or more customers, such as any of the ZTNAaaS platforms and related infrastructure described herein, or any other cloud-based system suitable for supporting a ZTNA data plane external to a customer premises as described herein. Where the application is to be accessed by an agentless application on a user device, access may require a domain name (e.g., a fully qualified domain name) to locate the application on the network. In order to facilitate such access, and to reliably configure service proxies and other infrastructure in the ZTNAaaS platform to support proper addressing of incoming application requests, the ownership of each domain name used to route application requests may advantageously be verified as described herein.

The domain name specified by the request may include a top level domain or sub-domain that the customer provides for network access to an application. In one aspect, verification of a domain (e.g., foo.com), may include verification of sub-domains for the domain (e.g., abc.foo.com), but not sub-sub-domains (e.g., 123.abc.foo.com). This convention can advantageously provide a greater address space for the verifier, while avoiding conflicts with other authorized users of sub-domains (who might otherwise allocate conflicting sub-sub domain names).

As shown in step 806, the method 800 may include generating a token. This may include, for example, generating, at a threat management facility or other location associated with the ZTNAaaS platform and infrastructure, a random string or the like for use as the token in response to the customer request for verification. Information may be encoded into the token such as a time stamp, source identifier, digital signature, or other information. However, this information is not generally required for purposes of domain ownership verification as described herein, e.g., where the token can be securely stored, tamper-free, by the threat management facility until it is needed for comparison to a text record maintained by a Domain Name System host for the domain, e.g., in a DNS record 808.

As shown in step 810, the method 800 may include providing the token to the customer. The token may be provided by transmitting the token for display in a user interface such as a user interface of the threat management facility where the customer is registering the domain. The token may also or instead be provided by transmitting the token to a predetermined address associated with the customer, such as an electronic mail address, an instant messaging address, a telephone number, or the like. Operationally, once a token has been provided to the user, the threat management facility may prompt the user for verification with a "verify" button. This provides the customer with an opportunity to update the DNS record 808 before continuing with the verification process.

As shown in step 812, the method 800 may include receiving the token, e.g., using any of the techniques described above. For example, the token may be displayed to the customer in a user interface such as the user interface for the threat management facility (e.g., in a location near the "verify" button), or the token may be provided in an instant message, electronic mail or the like.

As shown in step 814, the method 800 may include updating the DNS record 808 for the domain from a customer account with the DNS host. This may, for example, include logging into the DNS host as an administrator, launching a management console, selecting the appropriate domain name, and then adding a new record. In particular, DNS provides a DNS TXT record for storing owner-configurable, publicly accessible text associated a domain name. The DNS TEXT record thus provides a convenient medium for adding user-selected data, such as the token, without altering functional DNS server data for the domain name, such as corresponding IP addresses.

As shown in step 816, the method 800 may include checking for a presence of the token in the DNS record 808, such as a Domain Name System text record ("DNS TXT record") stored for the domain at a DNS host. In general, DNS data is made publicly available by the DNS host, so the threat management facility (or other resource) may query this information, e.g., using a Linux dig command, nslookup, or other technique to access DNS records, and more specifically to check whether the token sent to the customer can be located in the DNS TXT record. This verification may be deferred, e.g., until a customer selects a "verify" button or the like, in order to provide the customer with an opportunity to update the DNS record 808. Thus in one aspect, the method 800 may include receiving an explicit request to verify the domain from the customer before checking for the presence of the token in the domain name system text record. The method may also or instead include automatically checking for the presence of the token in the domain name system text record after providing the token to the customer, e.g., by waiting a predetermined time and, if the user has not manually requested verification, proceeding with an automatic verification. If the ownership cannot be verified (by presence of the token in the DNS record 808) after a predetermined time, then the verification process may be terminated or expired, requiring the customer to initiate a new registration request, e.g., by returning to step 802.

As shown in step 818, the method 800 may include registering the domain to the customer, e.g., for accessing ZTNA applications hosted on the customer premises through the ZTNAaaS data plane. This step may advantageously be deferred until the verification is completed as described above, however, the method 800 may also or instead include registering the domain while imposing other safeguards on use of the registered domain while verification is pending. In one aspect, registering the domain may include configuring a service proxy on the cloud computing platform to provide access to the application on the customer premises, e.g., by updating configuration information for the service proxy and reverse proxy server in the ZTNAaaS platform to direct requests received at the cloud computing platform to an appropriate ZTNA appliance at the customer premises, e.g., a ZTNA appliance that is providing access to the target application.

This may also include additional configuration steps at the ZTNAaaS platform, such as creating a secure tunnel from the cloud computing platform to the application on the customer premises, e.g., through a ZTNA appliance. Creating the secure tunnel may include coupling the secure tunnel with the reverse proxy server at the cloud computing platform. Creating the secure tunnel may also or instead include coupling the secure tunnel with a zero trust network access appliance at the customer premises.

Registering the domain to the customer may also or instead include supporting use of the ZTNA application according to the configuration. For example, registering the domain may include, in response to a request from a client to the domain, providing zero trust network access for the client to the application through the cloud computing platform.

Registering the domain to the customer may also or instead include additional administrative steps after verification. For example, if a verified domain was previously registered to a different user, the method 800 may include invalidating or revoking this conflicting claimed ownership, e.g., in any conflicting components throughout the control and data plane including, e.g., any conflicting configuration information in service proxies, ZTNA appliances, threat management facilities, and so forth.

As shown in step 820, the method 800 may also include configuring the ZTNA appliance for access to the application at the registered domain name. This may include any necessary configuration of the ZTNA appliance, which may be performed locally at the customer premises and/or through an administrative interface at the threat management facility, as well as ensuring that instances of the application are executing on the customer premises and connected to the ZTNA appliance in a manner suitable for remote access. After the ZTNAaaS platform, ZTNA appliance, and application have been configured, a request from a client to the domain, if received at the cloud computing platform, may be responded to by providing zero trust network access for the client to the application through the cloud computing platform.

According to the foregoing, there is also disclosed herein a system including a customer premises hosting an application; a cloud computing platform coupled to the customer premises through a secure tunnel, the cloud computing platform configured to provide zero trust network access to the application through the secure tunnel; a threat management facility providing a control plane for the zero trust network access, the threat management facility configured to: receive a request from the customer to register a domain for zero trust network access to the application; provide a token to the customer; locate the token in a record stored at a domain name system host for the domain; and register the domain for access to the application through the zero trust network access provided by the cloud computing platform.

The system may include a reverse proxy server executing on the cloud computing platform and coupled to the secure tunnel for secure communications with the customer premises. The system may include a zero trust network access appliance at the customer premises and coupled to the secure tunnel for secure communications with the cloud computing platform. The zero trust network access appliance may include at least one of a hardware appliance and a virtual appliance.

Figure 9:
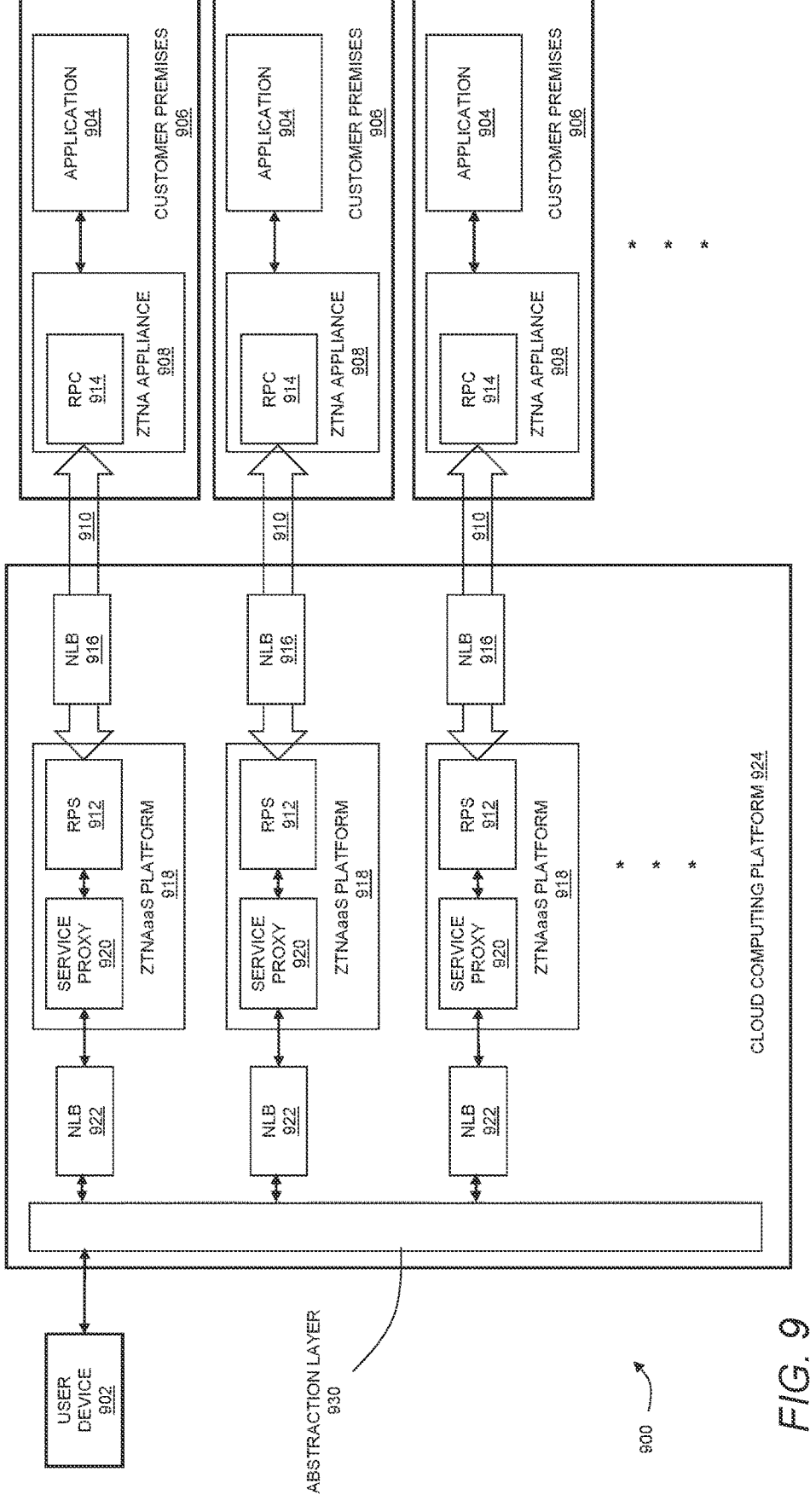
FIG. 9 shows a cloud computing platform with an abstraction layer that maps application domains to network load balancers.

FIG. 9 shows a cloud computing platform with an abstraction layer that maps application domains to network load balancers. In general, a system 900 may connect a user device 902 to an application 904 hosted on customer premises 906 through the customer's ZTNA appliance 908, which connects, via a secure tunnel 910 between a reverse proxy server 912 and a reverse proxy client 914, through a network load balancer 916 to a ZTNAaaS platform 918 that includes a service proxy 920 that is configurable to resolve requests and direct them to the correct secure tunnel for a corresponding application. The service proxy 920 may be positioned behind a second network load balancer 922 in order to support scalability by managing the distribution of incoming requests for ZTNA applications among available resources. In general, each service proxy 920 may be configured to support multiple applications for a single customer, as well as applications for two or more different customers at different customer premises. Thus, the service proxies 920 may be arranged into clusters of service proxies 920, each associated with one of the network load balancers 922, and each associated with one or more specific ones of the applications 904. The user device 902, application 904, customer premises 906, ZTNA appliance 908, secure tunnel 910, reverse proxy server 912, reverse proxy client 914, network load balancer 916, ZTNAaaS platform 918, service proxies 920, network load balancers 922 and other components may all be any such components described herein, or the like.

The cloud computing platform 924 hosting the ZTNAaaS platforms 918 may include an abstraction layer 930 interposed between the user device 902 and the network load balancers 922 for the cloud computing platform 924. The abstraction layer 930 may be configurable, e.g., by a threat management facility (not shown), to map requests for a particular domain (e.g., a domain associated with a specific one of the applications 904) to a specific one of the network load balancers 922. This permits administrative control, e.g., through the threat management facility or other administrative components, over which application requests (and/or domain names) are directed to which network load balancers 922. By providing this abstraction layer 930, each service proxy 920 may advantageously be assigned to a predetermined subset of applications 904, and each network load balancer 922 may, in turn, be assigned to a predetermined subset of service proxies 920. Network load balancer 922 may be assigned to a predetermined group of applications 904. This approach advantageously simplifies the configuration of service proxies 920 at the cloud computing platform 924 by permitting dedicated relationships among network load balancers 922 facing a public network, specific service proxies 920 in the cloud computing platform 924, and specific applications 904 on customer premises 906, while concurrently reducing or avoiding the administrative burden on customers of updating network pointers when clusters of service proxies allocated to a specific application 904 are periodically reconfigured to adjust to varying user traffic.

According to the foregoing, in one aspect there is disclosed herein a system including a customer premises hosting an application, the customer premises including a zero trust network access appliance configured to provide zero trust network access to the application through a secure tunnel. The system may also include a cloud computing platform coupled to the zero trust network access appliance through the secure tunnel, the cloud computing platform comprising one or more processors and memory storing code that, when executing on the one or more processors, performs the steps of: hosting a cluster of service proxies, the cluster of service proxies configured to provide access to the application, providing a network load balancer associated with the cluster of service proxies, and providing an abstraction layer that maps requests for a domain to the network load balancer for the cluster of service proxies associated with the corresponding application. The system may generally include any of the customer premises, applications, zero trust network access appliances, secure tunnels, cloud computing platforms, service proxies, network load balancers, and abstraction layers described herein.

The system may also include a threat management facility, such as any of the threat management facilities described herein. The threat management facility may be configured to provide a control plane for zero trust network access to the application, and to manage network security for the customer premises. In order to facilitate the use of an abstraction layer, the threat management facility may be further configured to generate an alias domain for the application and transmit the alias domain to the cloud computing platform for use as the domain (for accessing the application) in the abstraction layer. In one aspect, the cloud computing platform hosts a plurality of clusters of proxies, each one of the plurality of clusters of proxies associated with a predetermined one or more applications in a group of applications that is different from each other one of the plurality of clusters of proxies. In another aspect, the cloud computing platform may be configured to add a service proxy to the cluster of service proxies or remove a service proxy from the cluster of service proxies based on a demand for use of the application. In this manner, access to applications may be organized and scaled as needed according to, e.g., network traffic or other performance metrics.

Figure 10:
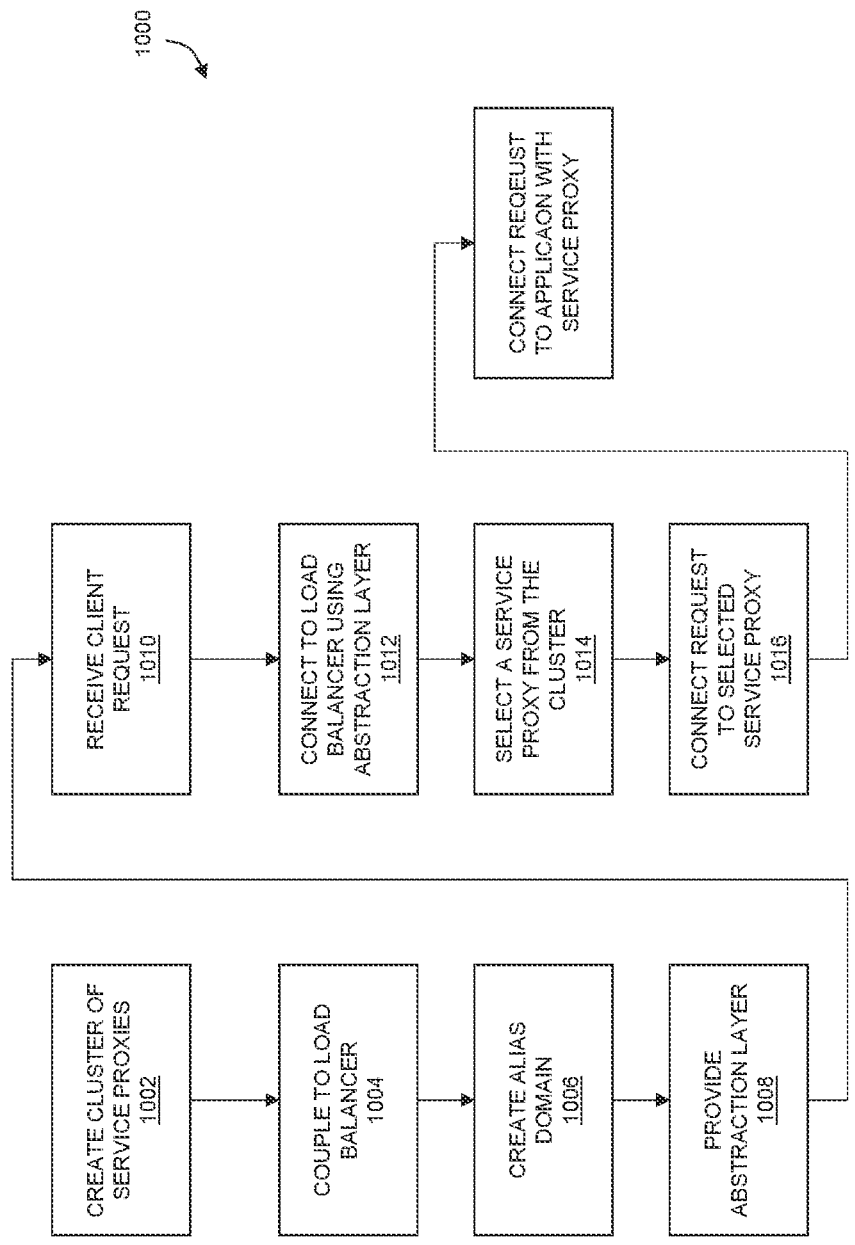
FIG. 10 shows a method of using alias domains for accessing ZTNA applications.

FIG. 10 shows a method of using alias domains for accessing ZTNA applications. Where a cloud computing platform provides zero trust network access as a service to customers that maintain applications on-premises, the cloud computing platform may advantageously associate customers and/or applications with specific service proxies. An abstraction layer for network access may then be added that maps an alias domain for each customer and/or application to a network load balancer associated with the specific service proxies associated with the corresponding application(s). In general, the method 1000 may be performed using the systems, computing devices, and other methods described herein. For example, a cloud computing platform may be configured to provide a data plane for zero trust network access to an application hosted on a customer premises, as described herein, and the cloud computing platform may include a cloud-based zero trust network access platform configured to provide zero trust network access as a service to a plurality of customers associated with a plurality of customer premises (including the customer premises where the application is hosted).

As shown in step 1002, the method 1000 may include creating a cluster of service proxies and hosting the cluster of service proxies on a cloud computing platform. In general, the cluster of proxy servers may be a dedicated cluster servicing one or more predetermined applications, which may include one or more predetermined applications for a specific customer, or one or more applications associated two or more different customers having different customer premises. This may, for example, include independent corporations or other business or organizational entities. This may also or instead include independent divisions or the like within such entities. The nature of these independently operated customers is not important, except to illustrate that there need not be any preexisting operational or legal relationship among different customers in order for them to share a cloud computing platform and/or cluster of proxy servers as contemplated herein.

The cluster of service proxies may be configured to provide access to at least one application on at least one customer premises, e.g., by configuring each of the service proxies to respond to requests for the at least one application, or more generally, to a specific and predetermined sub-group of the applications and/or customers supported by the cloud computing platform. While the cloud computing platform might otherwise be required to configure each service proxy to respond to all managed applications, associating specific clusters of service proxies with specific subsets of applications advantageously permits the cloud computing platform to independently manage a group of service proxies (e.g., in the cluster) that is responsible for the specific subset of applications. This may include a group of applications related to a specific customer premises, or a group of applications spanning two or more different customer premises. In one aspect, each service proxy in a cluster may be identically configured so that a network load balancer can make allocations based on quantity of connections, or other traffic or performance metrics, rather than whether a particular service proxy can access a particular application. However, the advantages of the technique disclosed herein may also be achieved for a group of differently configured service proxies, e.g., where each service proxy in the cluster is configured for traffic to at least one set of applications that is common among all of the service proxies in the cluster.

As shown in step 1004, the method 1000 may include coupling the cluster of service proxies to a specific one of the network load balancers in the cloud computing platform. It will be appreciated that in one aspect, a cluster of service proxies may be associated with two or more of the network load balancers, and in another aspect, one of the network load balancers may be associated with two or more different clusters of service proxies associated with different groups of applications. In general, these allocations may depend on the volume of traffic for each application or customer, provided that a predetermined relationship between network load balancers and clusters of service proxies is maintained in a manner that facilitates the use of an abstraction layer to couple an external network request with an appropriate service proxy for a requested application. When arranged in this manner, the use of the abstraction layer can advantageously relieve the customer from identifying and configuring specific service proxies that are responsible for the customer's ZTNA applications deployed through the cloud computing platform.

In general, coupling to a specific load balancer, and the other administrative steps described herein (e.g., excluding operation of the ZTNA application and other unmanaged customer premises components), may be managed with a threat management facility such as any of those described herein. In one aspect, the threat management facility may be hosted remotely from the customer premises, and may provide security services for the customer premises. The threat management facility may also be configured to provides a control plane for zero trust network access to the application hosted on the customer premises.

As shown in step 1006, the method 1000 may include creating an alias domain for zero trust network access to one of the applications. This may include a preliminary check of whether a domain is owned by the customer who is creating a new ZTNA appliance or ZTNA application. For example, a preliminary check of domain ownership (or control) may be performed using domain ownership verification as described herein. If ownership (or control) is sufficiently verified, then creating the alias domain may include creating a fully qualified domain name (FQDN) for each ZTNA appliance configured for the application. The FQDN may, for example, include a Universal Unique Identifier (UUID), a gateway/application name, or other identifier to uniquely identify the application in a network environment, along with other zone information, region information, or other domain name identifiers or the like providing a unique path specifying a location where the application can be accessed. Creating the alias domain will also generally include updating DNS records so that the DNS record (or CNAME record, as appropriate) for the alias domain points to an address, such as an IP address, where a network load balancer for the application can be reached.

In one aspect, the alias domain may be managed by the threat management facility and communicated to the cloud computing platform, e.g., by providing a configuration service role that can create and delete zone records for a domain that is stored in the cloud computing platform, e.g., using a cross-account trust relationship between the threat management facility and the cloud computing platform. Whenever a gateway or application is created (or updated or deleted), the service may create (or update or delete) the corresponding alias domain in the cloud computing platform, or a Domain Name System web service or the like used by the cloud computing platform to manage addressing for applications. Thus in one aspect creating the alias domain may include creating the alias domain at the threat management facility and transmitting the alias domain to the cloud computing facility. In general, a DNS zone may be limited to a certain number of records. Thus in one aspect, once this quota has been reached with alias domains, a new zone may be created with corresponding sub-domains for additional applications.

More generally, any suitable techniques for generating a functioning domain name and mapping it at a DNS host to an address for a specific load balancer (e.g., a load balancer allocated to a cluster of service proxies for an associated application) may be used to create alias domains as described herein.

As shown in step 1008, the method 1000 may include providing an abstraction layer for the cloud computing platform that maps the alias domain to the network load balancer. In general, this may include any programmatic technique for associating alias domains with applications (or service proxies, or load balancers) in a manner that permits incoming requests for applications to be coupled to a specific one or more of the load balancers. For example, this may include a database or other data store or the like storing records that map domain and/or path information associated with an application to one or more predetermined load balancers that are coupled, in turn, to a cluster of service proxies configured to service requests for the corresponding application(s). The abstraction layer may also or instead include code to route or otherwise couple network requests received from an external network (e.g., from the user device 906 illustrated in FIG. 9) to the appropriate load balancer(s) and service proxy clusters based on this mapping. In general, the abstraction layer may be updated as needed to reflect changes in the allocation of applications and ZTNA appliances to different clusters of service proxies.

As shown in step 1010, the method 1000 may include receiving a request from a client at the cloud computing platform for an application serviced by a predetermined cluster of service proxies. In general, the application may include any of the ZTNA applications or other enterprise resources described herein, and the client may be any of the user devices or other computing devices described herein.

As shown in step 1012, the method 1000 may include connecting the request to a network load balancer with the abstraction layer. This may include identifying, based on data stored in the abstraction layer, or accessible to the abstraction layer, a cluster of service proxies associated with the requested application, and connecting the requested through the abstraction layer to the appropriate network load balancer. In another aspect, this may include directly identifying one or more predetermined network load balancers associated with the corresponding cluster of service proxies, and routing communicating the request to the network load balancer. In this case, the request will be communicated by the network load balancer to one of the service proxies in the dedicated cluster, each of which have been preconfigured to handle requests for the associated application.

As shown in step 1014, the method 1000 may include selecting a selected one of the service proxies from the cluster of service proxies with the network load balancer. In general, a network load balancer automatically distributes network traffic across multiple targets such as links, machines, virtual machines, compute instances, containers, IP addresses, or the like. The network load balancer may thus select a target for an incoming request using any suitable algorithm based on, e.g., the communication protocol, the source address and port, the destination address and port, a Transmission Control Protocol (TCP) sequence number, and so forth, and/or based on the health or responsiveness of available targets. These techniques may be used to efficiently distribute incoming requests for an application among the number of service proxies in a manner that balances use of each of the service proxies in the cluster. Each service proxy may, in turn distribute requests to one or more specific application instances associated with that service proxy in order to similarly balance use of application instances hosted on customer premises.

As shown in step 1016, the method 1000 may include connecting the request to the selected one of the service proxies from the cluster of service proxies with the network load balancer.

As shown in step 1018, the method 1000 may include connecting the request to the application hosted on the customer premises (e.g., with a ZTNA appliance as described herein) using the selected one service proxies from the cluster of service proxies, or more generally, transmitting the request to the application. This may include authenticating the client, or the user of the client, for zero trust network access to the at least one application, e.g., by requesting suitable credentials or other authentication factor(s) with the ZTNA appliance and authenticating the received credentials/factors with an identity management platform, such as any described herein, or any other trusted identity management infrastructure.

In general, the method 1000 described herein may be used with any of the other systems and methods described herein. Thus for example, transmitting the request to the application may include authenticating a client to the application for zero trust network access to the application, and or authenticating the application (or ZTNA appliance or the like) to the cloud platform when creating a secure tunnel therebetween. Transmitting the request to the application may also or instead include transmitting the request through a zero trust network access appliance hosted on the customer premises. In another aspect, transmitting the request to the application may include transmitting the request through a reverse proxy server hosted on the cloud computing platform, such as a reverse proxy server securely coupled to the zero trust network access appliance hosted on the customer premises. As further described herein, the reverse proxy server may be coupled to the zero trust network access appliance through a second network load balancer, and a reverse proxy client on the zero trust network access may authenticate to the reverse proxy server when establishing a secure tunnel between the customer premises and a cloud computing platform for the ZTNA data plane.

Using this technique, the infrastructure details for the network load balancer(s) handling application traffic may be abstracted, facilitating easier migration of application traffic from one network load balancer to another. This can also facilitate, where necessary or helpful, explicit partitioning of customer traffic, e.g., for improved performance.

Figure 11:
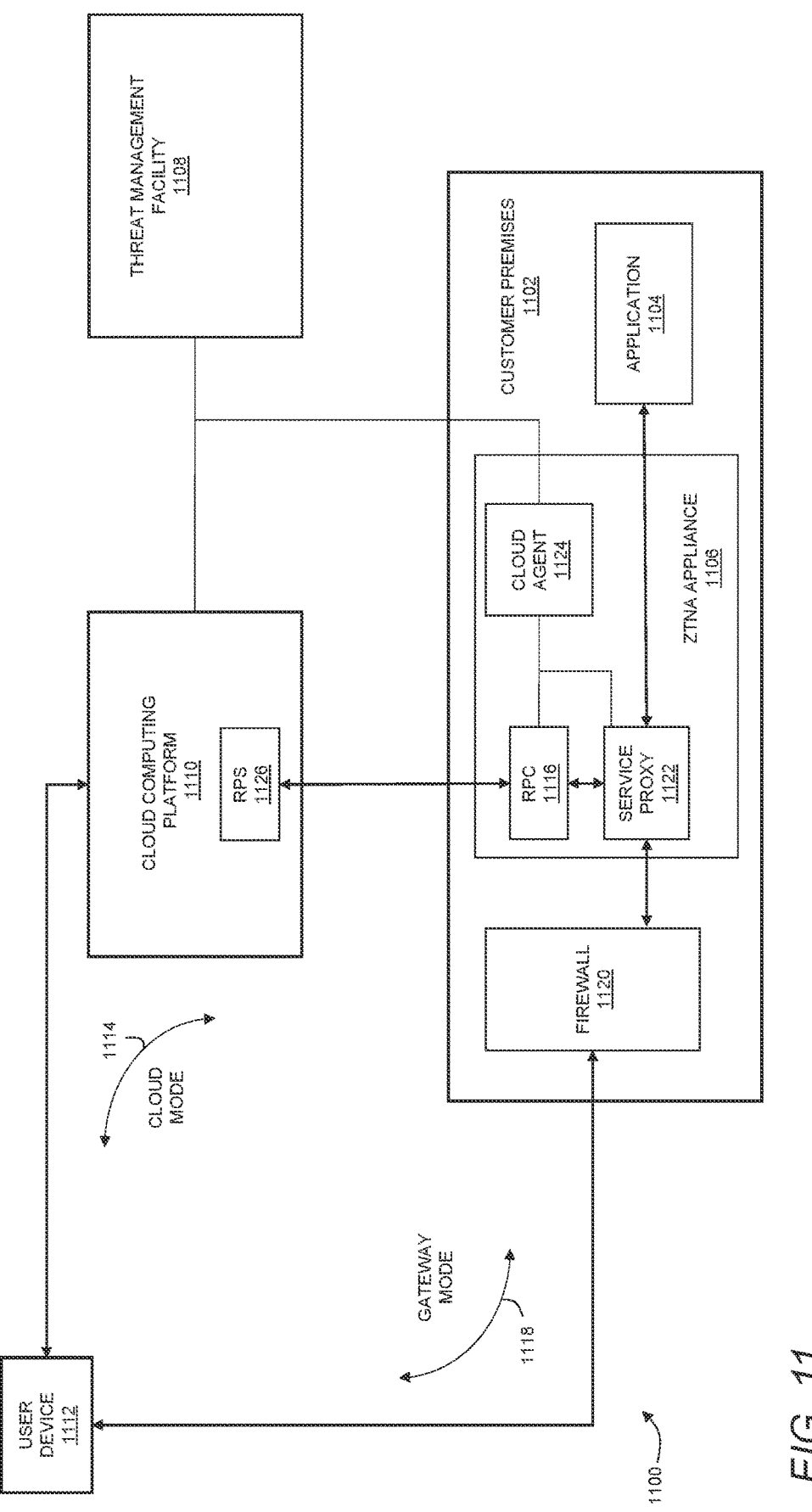
FIG. 11 shows a hybrid appliance for zero trust network access to customer applications.

FIG. 11 shows a hybrid appliance for zero trust network access to customer applications. In general, a zero trust network access appliance deployed at a customer premises can support a gateway mode and a cloud mode. In the gateway mode, the appliance may operate as a zero trust network access gateway and provide zero trust network access to applications hosted at the customer premises using a firewall at the customer premises for network security. In the cloud mode, the appliance may initiate a secure connection with a remote, cloud computing platform that provides a front end for zero trust network access. A threat management facility for the customer may provide a control plane for managing zero trust network access provided through the cloud computing platform, and for selecting between the cloud mode and the gateway mode for the appliance. In general, the applications, appliances, gateways, customer premises, firewalls, cloud computing platforms, threat management facilities, and other components may be any as described herein.

As shown in FIG. 11, the system 1100 may include a customer premises 1102 hosting an application 1104 through a ZTNA appliance 1106. The ZTNA appliance 1106 may be managed by a threat management facility 1108, all as generally described herein. A cloud computing platform 1110 may host a ZTNAaaS service that provides a configurable data plane for ZTNA access to the application 1104, e.g., by a user device 1112. The ZTNA appliance 1106 may be a hybrid appliance configured to operate in either a cloud mode or a gateway mode. In the cloud mode, the hybrid appliance may provide a first data path 1114 for the application 1104 through the cloud computing platform 1110 (via a local reverse proxy client 1116). In the gateway mode, the hybrid appliance may provide a second data path 1118 through a firewall 1120 on the customer premises 1102. The ZTNA appliance 1106 may generally include a service proxy 1122, such as any of the service proxies described herein, configured to manage ZTNA functions of the ZTNA application, and further configured to switch between the cloud mode and the gateway mode, e.g., under control of a cloud agent 1124 securely coupled to the threat management facility 1108.

According to the foregoing, there is disclosed herein a system 1100 including an application 1104 hosted on a customer premises 1102. The system 1100 may also include a firewall 1120 between the customer premises 1102 and a public data network (not shown), and a threat management facility 1108 configured to manage security for the customer premises 1102. The system 1100 may also include a cloud computing platform 1110 hosted remotely from the customer premises 1102, and the cloud computing platform 1110 may be configured to provide zero trust network access to the application 1104 by a user device 1112 operated by a user associated with the customer premises 1102. The system 1100 may also include a zero trust network access appliance 1106 hosted on the customer premises 1102.

As described herein, the zero trust network access appliance 1106 may be a hybrid appliance configured to respond to a user input (e.g., from an administrative console of the threat management facility 1108) by selecting between operating in a gateway mode and operating in a cloud mode. In the gateway mode, the zero trust network access appliance 1106 may operate as a zero trust network access gateway to provide zero trust network access from the public data network to the application 1104 through the firewall for the customer premises 1102. In the cloud mode, the zero trust network access appliance 1106 may act as a zero trust network access connector coupling the application 1104 hosted on the customer premises 1102 to the cloud computing platform through a secure tunnel to provide zero trust network access from the public data network to the application 1104 through the cloud computing platform 1110. The threat management facility 1108 may generally provide a control plane for configuring the zero trust network access appliance to operate in the cloud mode or the gateway mode, e.g., by accessing the zero trust network appliance 1106 through the cloud agent 1124.

As also generally described herein, the zero trust network access appliance 1106 may be configured to authenticate a user on the user device 1112 (or in some instances, the user device 1112 itself) for zero trust network access to the application 1104, e.g., with user credentials, one or more other authentication factors, or any combination of these or the like. For example, the zero trust network appliance 1106 may authenticate using biometric authentication factors, hardware-based tokens or authentication factors, software-based tokens or authentication factors, user credentials, and so forth. In one aspect, a heartbeat from a user device, such as any of the heartbeats described herein, may include a secure (e.g., encrypted or signed) assertion of a health status of the user device, which may be used as an authentication factor when controlling access to the application 1104 through the zero trust network access appliance. In one aspect, the zero trust network appliance 1106 may authenticate the user using a third party identity management platform external to the customer premises 1102, or using any other source of trust and/or identity information. In another aspect, the cloud computing platform 1110 may be configured to authenticate the user for zero trust network access to the application 1104, e.g., by providing an authentication server or other authentication infrastructure through the secure tunnel provided by the reverse proxy client 1116, and/or using a secure connection to the threat management facility 1108 or a separate, trusted source of authentication services.

As also generally described herein, the cloud computing platform may provide a data plane for zero trust network access to the application 1104 hosted on the customer premises 1102. The system 1100 may also include a reverse proxy server 1126 on the cloud computing platform 1110, which may be configured to create the secure tunnel with the zero trust network access appliance 1106 hosted on the customer premises 1102. In one aspect, the zero trust network access appliance 1106 may be configured to make an outbound connection to the reverse proxy server 1126 of the cloud computing platform 1110, authenticate to the reverse proxy server 1126 with an authentication server (not shown) hosted on the cloud computing platform 1110, establish a secure tunnel between the zero trust network access appliance 1106 and the reverse proxy server 1126, and use the secure tunnel to provide zero trust network access by the user of the user device 1112 to the application 1104 that is hosted on the customer premises 1102.

In one aspect, the threat management facility 1108 may be configured to provide a user interface for administrative configuration of the zero trust network access appliance 1106 and the cloud computing platform 1110. For example, the user interface may facilitate user selection between the gateway mode and the cloud mode for the zero trust network access appliance 1106.

More generally, there is disclosed herein a system for zero trust network access to a customer application comprising an application 1104 hosted on a customer premises 1102 and a zero trust network access appliance 1106 hosted on the customer premises 1102, where the zero trust network access appliance 1106 is configured to respond to a user input by selecting between a gateway mode and a cloud mode. In the gateway mode, the zero trust network access appliance 1106 may operate as a zero trust network access gateway to provide zero trust network access to the application 1104 at the customer premises 1102. In the cloud mode, the zero trust network access appliance 1106 may act as a zero trust network access connector coupling the application 1104 hosted on the customer premises 1102 to a cloud computing platform 1110 to provide zero trust network access to the application 1104 at the cloud computing platform 1110. When operating as the zero trust network access gateway, the ZTNA appliance 1106 may generally expose the application 1104 to a data network through a firewall 1120 of the customer premises 1102, which may perform any suitable firewall functions for securing the customer premises 1102 against malicious activity. When operating as a zero trust network access connector, the ZTNA appliance 1106 may expose the application 1104 to the data network through a secure tunnel, e.g., a secure tunnel between the zero trust network access appliance 1106 and a reverse proxy server 1126 on the cloud computing platform 1110.

The system 1100 may also use any of the other cloud computing or other components described herein. For example, the system 1100 may include a service proxy on the cloud computing platform 1110, the service proxy coupled to the reverse proxy server 1126 and configured to expose the application 1104 to a data network for access by remote users. The system 1100 may also or instead include a network load balancer coupling the service proxy to the data network. The network load balancer facing the data network may, for example, be configured to select a service proxy at the cloud computing platform for responding to a request for the application 1104, and/or may be configured to select a service proxy from cluster of service proxies for responding to a request from the data network for the application 1104. The system 1100 may also or instead include a network load balancer between the cloud computing platform 1110 and the customer premises 1102, which may be configured to select a reverse proxy server from among a number of reverse proxy servers for handling a connection between the zero trust network access connector and the cloud computing platform 1110.

FIG. 12 shows a method for dynamic routing of application traffic to ZTNA connectors. In general, a cloud computing platform may provide zero trust network access as a service to customers that maintain applications on-premises, and a zero trust network access appliance at the customer premises may operate in a cloud mode as a ZTNA connector to couple the on-premises applications to the cloud computing platform, all as described herein. A customer may host multiple instances of the appliance in order to support scalable access, and each instance may create a separate secure tunnel to the cloud computing platform. In this context, when a new appliance authenticates a new secure tunnel, information such as a connector name, customer, and port for the tunnel may be shared on a control plane for the computing platform to facilitate programmatic load balancing within the cloud computing platform. Based on this information, each instance of the application may be individually selected, and/or traffic may be managed among the different instances, by addressing each instance of the application through its corresponding secure tunnel. In the method 1200 described below, the ZTNA connectors, cloud computing platforms, customer premises, applications, secure tunnels, and other components may be any as described herein.

As shown in step 1202, a method 1200 for dynamic routing of application traffic to ZTNA connectors (or appliances) may include receiving a request to configure a ZTNA application. This may, for example, include a request to provide zero trust network access to an application hosted on a customer premises, or more specifically, receiving, at an administrative console of a threat management facility, a request to provide access to an application hosted on a customer premises through a zero trust network access appliance. The request may contain, e.g., information for identifying the application and network location, and/or any other information necessary or helpful for initiating managed ZTNA access to the application.

As shown in step 1204, the method 1200 may include configuring the zero trust network access appliance at the customer premises, for example, by specifying first configuration information. For example, the first configuration information may include a name of the application, a certificate for authenticated access the application, and/or a fully qualified domain name for accessing the application on a network. The configuration may include providing any necessary information to the threat management facility, and then transmitting this information and other automatically generated configuration information to a ZTNA appliance on the customer premises, for example using a secure connection from a threat management facility to a cloud agent or other resource on the customer premises that is coupled to the ZTNA appliance.

As shown in step 1206, the method 1200 may include receiving second configuration information for the application. For example, deploying the ZTNA application may include creating a secure tunnel between the customer premises and a cloud computing platform as described herein. When a reverse proxy client on the ZTNA appliance creates the secure tunnel to a reverse proxy server on the cloud computing platform (which will provide a cloud-based data plane for the application), the reverse proxy server may share this information, via the control plane, with the threat management facility and other components of the cloud computing platform to facilitate configuration of the data plane components for provisioning of the application through the cloud computing platform. By way of non-limiting example, this second configuration information may include a port or other network identifier of a reverse proxy server at the cloud computing platform that is connected to a reverse proxy client of the zero trust network access appliance (e.g., through a secure tunnel between the client and server).

As shown in step 1208, the method 1200 may include configuring a service proxy at the cloud computing platform to provide access to the application based on the first configuration information and the second configuration information. For example, user configuration information such as the application name, authentication certificates, and FQDN(s) may be provided through the administrative interface when initiating configuration of the ZTNA application, and results of successful provisioning, such as the application port number, may be obtained through the control plane after the connection to the ZTNA appliance is created and assigned to a port on the reverse proxy server. This data may collectively be pushed out from the threat management facility or other control locus to configure a service proxy in the cloud computing platform to respond to requests for the application, and more specifically, requests for the application directed to the FQDN(s).

As shown in step 1210, the method 1200 may include instantiating additional instances of the ZTNA application. For example, this may be based on a performance test for a particular application, for a particular ZTNA appliance, or for a particular customer premises, and may include performance evaluations based on latency, bandwidth, service levels, and so forth. However measured, the results of performance testing may be used as the basis for automatically or manually controlling the addition or removal of ZTNA appliances to ensure a desired level of service or access. Thus in one aspect, the method 1200 may include instantiating a plurality of instances of a ZTNA appliances for applications on the customer premises. Each ZTNA appliance may have its own reverse proxy client forming a secure tunnel to the cloud computing platform. However, each ZTNA appliance may also have local access to, and responsibility for, multiple applications hosted on the customer premises.

In order to facilitate dynamic scaling of ZTNA appliances in this context, the configuration process may be used to ensure that a list of applications associated with a ZTNA appliance on the customer premises is pushed to the control plane so that service proxies executing on the cloud computing platform can be correspondingly configured to forward specific application traffic to specific secure tunnels. This information can more generally be used, e.g., to support load balancing in the data plane. For example, where the service proxies within the cloud computing platform have access to unencrypted data traffic, this advantageously permits programmatic load balancing of traffic within the cloud computing platform based on, e.g., request payloads, request parameters, the name or type of a requested application, and so forth, in addition to any network-layer and/or traffic-based load balancing using network load balancers as described herein.

As shown in step 1212, the method 1200 may include configuring a cluster of service proxies at the cloud computing platform to provide access to the application. This may, for example, include configuring service proxies for use in the data plane for the ZTNA appliance, and identifying a set of similarly or identically configured service proxies for use with one or more predetermined network load balancers, such as with any of the abstraction layers described herein.

As shown in step 1214, the method 1200 may include load balancing for the cluster, e.g., by dynamically routing requests for the application among the plurality of zero trust network access appliances at the cloud computing platform to balance a load associated with use of the application among the plurality of zero trust network access appliances. In addition to connecting specific application traffic to specific secure tunnels to managed traffic flows as described herein, this may also, for example, include causing a network load balancer, such as any of the network load balancers described herein, to manage demand for the application among a plurality of secure tunnels for a plurality of zero trust network access appliances known to have connectivity to the application, or more generally, to manage connections between the cloud computing platform and secure tunnels coupled to instances of the ZTNA appliance and ZTNA applications. Load balancing may also or instead include causing a second network load balancer to manage network traffic between a public data network and the cluster of service proxies configured to provide access to the application. In this manner, incoming traffic to the service proxies may advantageously be load balanced independently from traffic with ZTNA appliances for a particular application. In a multi-tenant environment or the like, where a particular service proxy or cluster of service proxies may have traffic for many different customers, this can advantageously help to ensure that public facing service proxies scale appropriately to aggregated traffic, while customer facing reverse proxy servers scale appropriately to customer-specific or application-specific traffic, all without explicitly sorting or analyzing traffic that is received from the public data network.

According to the foregoing, in one aspect, there is described herein a multi-layered load balancing system for a cloud-based ZTNA data plane. This may include a first layer of network load balancers facing a data network external to a ZTNA application. This layer may include an abstraction layer that allocates specific application requests to suitably configured clusters of service proxies. The service proxies in a cluster may also programmatically support load balancing by allocating specific application traffic to specific secure tunnels based on configuration information provided to the service proxies as new ZTNA appliances are provisioned. Finally, a second layer of network load balancers may be positioned between the service proxies and one or more ZTNA appliances. In this manner, the second layer of network load balancers can automatically manage traffic across a number of ZTNA appliances for a customer on a tunnel-by-tunnel basis independently of application-specific traffic.

As described herein, the threat management facility may provide a control plane for managing zero trust network access to the application through the cloud computing platform. Thus, the method 1200 may include, with the threat management facility, configuring a plurality of ZTNA appliances at the customer premises for an application, and/or configuring a plurality of instances of a ZTNA application for use with a ZTNA appliance.

According to the foregoing, there is also disclosed herein a system for dynamically routing zero trust network access to a customer application. In general, the system may include a customer premises, a cloud computing platform, and a threat management facility. The customer premises may include an application and a zero trust network access appliance configured to authenticate users for access to the application. The zero trust network access appliance may include a reverse proxy client for creating secure tunnels to the cloud computing platform. The cloud computing platform may be remote from the customer premises, and may include a plurality of service proxies providing a network access point for the application, a network load balancer for distributing access requests to the plurality of service proxies, and a reverse proxy server configured to establish a secure tunnel to the reverse proxy client of the zero trust network access appliance. The threat management facility may be remote from the customer premises and the cloud computing platform, and may be configured to provide security services for the customer premises and a control plane for zero trust network access to the application through the cloud computing platform. The threat management facility may also be configured to managed the ZTNA infrastructure, e.g., by performing the steps of receiving configuration information for the application from the cloud computing platform, the configuration information including a name of the application and a port of the reverse proxy server for the secure tunnel, and configuring one or more of the plurality of service proxies to forward a request from a client for the application to the reverse proxy server and the port for the secure tunnel.

The plurality of service proxies may include a cluster of service proxies accessed through a network load balancer as described herein. The threat management facility may be further configured to scale the application by performing the steps of, in response to detecting a degradation in performance of the application: configuring a second zero trust network access appliance at the customer premises, connecting the second zero trust network access appliance to the cloud computing platform through a second secure tunnel; and configuring the one or more of the plurality of service proxies to forward the request from the client for the application to either of the secure tunnel or the second secure tunnel. The cloud computing platform may also include a second network load balancer for managing traffic relating to the application between the secure tunnel and the second secure tunnel.

The configuration information may include any information useful for configuring the data plane or other components of the ZTNA infrastructure. For example, the configuration information may include a certificate for the application, or any other keys or other information useful for authenticating the application with reference to a trusted third party. The configuration information may also or instead include a fully qualified domain name for accessing the application. The configuration information may also or instead include a name of a customer associated with the customer premises hosting the application, or any other information for identifying the customer, the application, or the application location. In another aspect, the configuration information may include a name of the zero trust network access appliance providing access to the application.

FIG. 13 shows a method for scaling tunnels for zero trust network access (ZTNA) appliances. In general, a cloud computing platform provides zero trust network access as a service to a customer that maintain applications on-premises, and a ZTNA appliance at the customer premises couples the on-premises applications to the cloud computing platform. In this context, the number of secure tunnels maintained for an application between the customer premises and the cloud computing platform may be dynamically managed to support variations in user demand for the application. The cloud computing platform, ZTNA appliance, customer premises, applications, and other components may be any as described herein.

As shown in step 1302, the method 1300 may include providing a first reverse proxy server on a cloud computing platform. The first reverse proxy server may be any of the reverse proxy servers described herein, and may have a first secure tunnel to a first zero trust network access appliance executing on a customer premises and managing zero trust network access to an application hosted on the customer premises.

As shown in step 1304, the method 1300 may include monitoring resource usage of the first reverse proxy server. This may generally include any resource usage that can be monitored for the reverse proxy server and that can might usefully provide a benchmark for evaluating whether to add or remove reverse proxy servers for an application such as a ZTNA application (or ZTNA appliance) managed through a cloud computing platform as described herein. For example, the resource usage may include central processing unit utilization for a physical or virtual machine executing the first reverse proxy server. The resource usage may also or instead include a memory usage for the machine. In another aspect, the resource usage may include a measure of network performance such as bandwidth used by the application or latency of responses to requests for the application. Metrics such as latency may usefully be measured end to end, e.g., from when a service proxy receives a request to when the service proxy transmits a response from the application, or over any other physical or logical interval that can be monitored by the cloud computing platform. Where instrumentation of the customer premises is available, this may also or instead include latency, delays, or processing/memory usage by appliances, applications, or other components executing on the customer premises.

As shown in step 1306, the method 1300 may include responding to a threshold, such as a predetermined threshold for any of the resource usages described herein.

When the resource usage for the first reverse proxy meets a predetermined threshold such as a utilization or latency limit, responding to the threshold may include causing the one or more computing devices to perform the steps of: instantiating a second reverse proxy server on the cloud computing platform, instantiating a second reverse proxy client on the customer premises, and coupling the second reverse proxy client to the second reverse proxy server to establish a second secure tunnel. In this manner, additional secure tunnels (and associated computing components) may be added dynamically as needed in response to an increase in usage demands that exceeds a monitored resource usage limit.

This dynamic scaling may be performed by adding tunnels (e.g., reverse proxy clients) on a single ZTNA appliance, or by adding ZTNA appliances, or some combination of these. For example, instantiating the second reverse proxy client may include configuring a second zero trust network access appliance on the customer premises and instantiating the second reverse proxy client on the second zero trust network access appliance. In another aspect, instantiating the second reverse proxy client may include instantiating the second reverse proxy client on the first zero trust network access appliance. In either case, a complementary reverse proxy server may be instantiated on the cloud computing platform if/as necessary to handle a new connection to the new reverse proxy client, along with a corresponding service proxy if/as needed. In some embodiments, only one of these techniques may be used to dynamically scale the number of available tunnels. In other embodiments, dynamic scaling may include selecting between these and/or other response techniques based on contextual information such as whether the resource usage is network related (suggesting the use of additional tunnels to expand network capacity) or processor/memory related (suggesting the use of additional appliances to expand processing capacity). In another aspect, the number of tunnels for an appliance may be increased until some quota or other limit on tunnels for a ZTNA appliance is reached, after which a new ZTNA appliance will be instantiated on the customer premises (or requested, where the threat management facility does not independently control provisioning of ZTNA appliances for the customer). It will also be appreciated that this step may be performed iteratively, e.g., by adding an additional zero trust network access appliance, adding an additional secure tunnel, and allocating requests for the application among available secure tunnels until the resource usage for each available reverse proxy server is below the predetermined threshold.

When the resource usage for the first reverse proxy falls below a second predetermined threshold, which may be the same as or different than the predetermined threshold above, responding to the threshold may include unprovisioning ZTNA resources, e.g., by closing tunnels or terminating appliances. For example, this may include removing at least one of the first reverse proxy server and the second reverse proxy server when remaining reverse proxy servers for the application at the cloud computing platform can each handle traffic for the application while operating below the second predetermined threshold for resource usage. This step may also be performed iteratively, e.g., by de-provisioning resources as long as the remaining resources have sufficient processing capacity to operate below the first threshold that would otherwise trigger additional provisioning.

As shown in step 1308, the method 1300 may include allocating requests among the current resources, as adjusted in step 1306. For an increase in the number of tunnels, this may, for example, including allocating requests among the first secure tunnel and the second secure tunnel in order reduce the resource usage for the first reverse proxy server. For a decrease in the number of tunnels, this may include allocating requests among remaining tunnels unless and until the resource usage once again meets or exceeds the predetermined threshold. In general, this allocation may be performed automatically for the currently available tunnels, e.g., by using a network load balancer or other similar network resource disposed between reverse proxy servers and reverse proxy clients to balance usage of secure tunnels therebetween. In another aspect, this allocation may be performed by reconfiguring service proxies in the cloud computing platform to programmatically allocate application traffic in any desired manner.

In general, this process may be repeated substantially continuously as long as dynamic tunnel scaling adjustments are desired. As such, the method 1300 may return to step 1304 to continue monitoring resource usage according to any suitable metrics or parameters until another adjustment is required. In this manner, the method 1300 may continuously and dynamically adapt available tunnels/appliances by increasing or decreasing the available resources according to current demand.

According to the foregoing, a system for routing zero trust network access to a customer application, as described herein, may include a customer premises, a cloud computing platform, and a threat management facility. The customer premises may include an application, and a first zero trust network access appliance configured to authenticate users for access to the application. The first zero trust network access appliance may include a first reverse proxy client. The cloud computing platform may be remote from the customer premises, and may include a service proxy providing a network access point for the application, and a first reverse proxy server configured to establish a first secure tunnel to the first reverse proxy client of the first zero trust network access appliance. The threat management facility may be remote from the customer premises and the cloud computing platform, and may be configured to monitor a resource usage for the first reverse proxy server. The threat management facility may further be configured to respond to changes in the resource usage by, when the resource usage for the first reverse proxy server meets a predetermined threshold, performing the steps of instantiating a second reverse proxy server on the cloud computing platform, configuring a second zero trust network access appliance on the customer premises, and coupling the second zero trust network access appliance to the second reverse proxy server to establish a second secure tunnel. The system may also include a network load balancer configured to allocate requests among the first secure tunnel and the second secure tunnel, thereby reducing the resource usage by the first reverse proxy server.

The predetermined threshold may, for example, include one or more of a central processing unit usage limit for a machine executing the first reverse proxy server, a memory usage limit for a machine executing the first reverse proxy server, a bandwidth limit for the first secure tunnel, or a latency for the application. In one aspect, allocating requests may include directing traffic for the application through two or more network load balancers. Allocating requests may also or instead include allocating traffic for the application among two or more service proxies on the cloud computing platform, e.g., using a second network load balancer between the service proxies and a data network. In one aspect, the threat management facility may be configured to dynamically scale resources by adding one or more additional reverse proxy servers, adding one or more additional zero trust network access appliances, adding one or more secure tunnels, and allocating requests among available secure tunnels until the resource usage for each reverse proxy server is below the predetermined threshold. The threat management facility may also or instead be configured to dynamically scale resources by removing at least one of the first reverse proxy server and the second reverse proxy server when remaining reverse proxy servers for the application can each handle application traffic while operating below the predetermined threshold for resource usage. More generally, the threat management facility may continuously and dynamically scale the number of ZTNA applications based on any suitable resource metrics to avoid under-provisioning or over-provisioning based on current demand.

It will be appreciated that all of the foregoing methods and systems may be used along or in any suitable combination(s). Thus, for example, an abstraction layer may be used on the network front end for a cloud-based data plane, and dynamic tunnel scaling may be used on the customer premises back end. At the same time, new proxy configurations may be prevalidated and the ownership/control of domain names may be checked before permitting access to an application through the data plane with a user-specified fully qualified domain name. All such combinations are intended to fall within the scope of this disclosure unless specifically stated otherwise.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system for routing zero trust network access to a customer application, the system comprising:

a customer premises including:

an application, and a zero trust network access appliance configured to authenticate users for access to the application, the zero trust network access appliance including a reverse proxy client;

a cloud computing platform remote from the customer premises, the cloud computing platform including:

a plurality of service proxies providing a network access point for the application, a network load balancer for distributing access requests to the plurality of service proxies, and a reverse proxy server configured to establish a secure tunnel, wherein the plurality of service proxies is configured to couple an incoming request for the application to the reverse proxy server to the reverse proxy client of the zero trust network access appliance;

a threat management facility remote from the customer premises and the cloud computing platform, the threat management facility configured to provide security services for the customer premises and a control plane for zero trust network access to the application through the cloud computing platform, the threat management facility configured by computer executable code to provide a cloud-based data plane that connects a client to the application through the cloud computing platform by performing the steps of:

receiving configuration information for the application from the cloud computing platform, the configuration information including a name of the application and a port of the reverse proxy server for the secure tunnel;

configuring one or more of the plurality of service proxies to forward the incoming request from the client for the application to the reverse proxy server and the port for the secure tunnel, and in response to detecting a degradation in performance of the application:

configuring a second zero trust network access appliance at the customer premises, connecting the second zero trust network access appliance to the cloud computing platform through a second secure tunnel, and configuring the one or more of the plurality of service proxies to forward the request from the client for the application to either of the secure tunnel or the second secure tunnel, further wherein the cloud computing platform includes a second network load balancer for managing traffic relating to the application between the secure tunnel and the second secure tunnel; and an abstraction layer in the cloud computing platform, the abstraction layer configurable from the threat management facility to assign each of the plurality of service proxies in the cloud computing platform to a predetermined subset of applications hosted on one or more customer premises, and to assign the network load balancer to a predetermined subset of service proxies.

2. The system of claim 1, wherein the plurality of service proxies includes a cluster of service proxies accessed through the network load balancer.

3. The system of claim 1, wherein the configuration information for the application includes a certificate for the application.

4. The system of claim 1, wherein the configuration information for the application includes a fully qualified domain name for accessing the application.

5. The system of claim 1, wherein the configuration information for the application includes a name of a customer associated with the customer premises hosting the application.

6. The system of claim 1, wherein the configuration information for the application includes a name of the zero trust network access appliance providing access to the application.

7. The system of claim 1, wherein the reverse proxy client of the zero trust network access appliance is configured to create the secure tunnel by authenticating the zero trust network access appliance to the reverse proxy server on the cloud computing platform.

8. The system of claim 1, wherein the threat management facility includes an administrative console for configuring the zero trust network access appliance.

9. A computer program product comprising computer executable code embodied in non-transitory computer executable code that, when executing on one or more computing devices, causes the one or more computing devices to perform the steps of:

receiving, at an administrative console of a threat management facility, a request to provide access to an application hosted on a customer premises through a zero trust network access appliance, wherein the threat management facility is configured to provide a cloud-based data plane that connects a client to the application through a cloud computing platform;

configuring the zero trust network access appliance at the customer premises by specifying first configuration information including at least:

a name of the application, a certificate for authenticated access to the application, and a fully qualified domain name for accessing the application on a network;

receiving second configuration information for the application from the cloud computing platform, the second configuration information including at least a port of a reverse proxy server at the cloud computing platform connected to a reverse proxy client of the zero trust network access appliance through a secure tunnel;

configuring a service proxy at the cloud computing platform to provide access to the application based on the first configuration information and the second configuration information;

providing an abstraction layer in the cloud computing platform, the abstraction layer configurable from the threat management facility to assign the service proxy in the cloud computing platform to a predetermined subset of applications hosted on one or more customer premises, and to assign a network load balancer to a predetermined subset of service proxies; and in response to detecting a degradation in performance of the application with the threat management facility:

configuring a second zero trust network access appliance at the customer premises, connecting the second zero trust network access appliance to the cloud computing platform through a second secure tunnel, and configuring the service proxy to forward the request from the client for the application to either of the secure tunnel or the second secure tunnel, further wherein the cloud computing platform includes a second network load balancer for managing traffic relating to the application between the secure tunnel and the second secure tunnel.

10. The computer program product of claim 9, further comprising code that causes the one or more computing devices to balance a load to the application by performing the steps of:

instantiating a plurality of zero trust network access appliances for the application on the customer premises, configuring a cluster of service proxies at the cloud computing platform to provide access to the application, and causing the network load balancer to manage demand for the application among a plurality of secure tunnels for the plurality of zero trust network access appliances.

11. The computer program product of claim 10, further comprising code that performs the step of causing a second network load balancer to manage network traffic between a public data network and the cluster of service proxies configured to provide access to the application.

12. The computer program product of claim 9, wherein the threat management facility provides a control plane for zero trust network access to the application through the cloud computing platform.

13. The computer program product of claim 9, wherein the zero trust network access appliance is configured to provide access to a plurality of applications hosted at the customer premises.

14. A method comprising:

receiving a request to provide zero trust network access to an application hosted on a customer premises;

providing a cloud-based data plane that connects a client to the application through a cloud computing platform;

configuring a zero trust network access appliance at the customer premises by specifying first configuration information for the application;

receiving second configuration information for the application from the cloud computing platform that hosts a zero trust network access service for the application remotely from the customer premises;

configuring a service proxy at the cloud computing platform to provide access to the application through a secure tunnel based on the first configuration information and the second configuration information;

providing an abstraction layer in the cloud computing platform, the abstraction layer configurable to assign the service proxy in the cloud computing platform to a predetermined subset of applications hosted on one or more customer premises, and to assign a network load balancer to a predetermined subset of service proxies; and in response to detecting a degradation in performance of the application with a threat management facility for the customer premises:

configuring a second zero trust network access appliance at the customer premises, connecting the second zero trust network access appliance to the cloud computing platform through a second secure tunnel, and configuring the service proxy to forward the request from the client for the application to either of the secure tunnel or the second secure tunnel, further wherein the cloud computing platform includes a second network load balancer for managing traffic relating to the application between the secure tunnel and the second secure tunnel.

15. The method of claim 14, further comprising configuring a cluster of service proxies at the cloud computing platform to provide access to the application.

16. The method of claim 15, further comprising configuring a plurality of zero trust network access appliances at the customer premises for the application.

17. The method of claim 16, further comprising dynamically routing requests for the application among the plurality of zero trust network access appliances at the cloud computing platform to balance a load associated with use of the application among the plurality of zero trust network access appliances.

18. The method of claim 14, wherein the threat management facility is a cloud resource external to the customer premises.

19. The method of claim 14, wherein the first configuration information includes at least:

a name of the application, a certificate for authenticated access to the application, and a fully qualified domain name for accessing the application on a network.

20. The method of claim 14, wherein the second configuration information includes at least a port of a reverse proxy server at the cloud computing platform connected to a reverse proxy client of the zero trust network access appliance through the secure tunnel.

* * * * *